US012792441B2

(12) United States Patent
Park et al.

(10) Patent No.: US 12,792,441 B2
(45) Date of Patent: Nov. 10, 2026

(54) STORAGE DEVICE, METHOD OF OPERATING STORAGE DEVICE, AND METHOD OF OPERATING NON-VOLATILE MEMORY

(71) Applicant: Samsung Electronics Co., Ltd., Suwon-si (KR)

(72) Inventors: Jooyong Park, Suwon-si (KR); Sangwon Park, Suwon-si (KR); Jaeha Park, Suwon-si (KR); Heewon Son, Suwon-si (KR); Kyungduk Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/404,218

(22) Filed: Jan. 4, 2024

(65) Prior Publication Data

US 2024/0231987 A1 Jul. 11, 2024

(30) Foreign Application Priority Data

Jan. 11, 2023 (KR) ........................ 10-2023-0004323
Apr. 4, 2023 (KR) ........................ 10-2023-0044359

(51) Int. Cl.
*G06F 11/00* (2006.01)
*G06F 11/07* (2006.01)
*G06F 12/02* (2006.01)

(52) U.S. Cl.
CPC ........ *G06F 11/0772* (2013.01); *G06F 11/073* (2013.01); *G06F 12/0246* (2013.01)

(58) Field of Classification Search
CPC ............... G06F 11/0772; G06F 11/073; G06F 11/0775; G06F 11/3037
See application file for complete search history.

(56) References Cited

U.S. PATENT DOCUMENTS 7,679,133 B2 3/2010 Son et al.
8,010,573 B2 8/2011 Ikeda et al.
8,553,466 B2 10/2013 Han et al.
8,559,235 B2 10/2013 Yoon et al.
8,654,587 B2 2/2014 Yoon et al.
9,875,170 B2 1/2018 Kim
10,942,800 B2 3/2021 Yun et al.
11,080,135 B2 8/2021 Chen et al.
2011/0233648 A1 9/2011 Seol et al.
2017/0004063 A1* 1/2017 Broderick ........... G06F 11/3495
(Continued)

*Primary Examiner* — Philip Guyton
(74) *Attorney, Agent, or Firm* — Harness, Dickey & Pierce, P.L.C.

(57) ABSTRACT

A method of operating a storage device including a storage controller and non-volatile memories includes detecting, by the storage controller, an event of a first non-volatile memory among the non-volatile memories, generating, by the storage controller, event information based on the detected event and transmitting, by the storage controller, the event information including an event type to the first non-volatile memory, generating, by the first non-volatile memory, internal information or data of the first non-volatile memory as debugging data in response to the event information, storing the debugging data by the first non-volatile memory, and updating, by the first non-volatile memory, an event flag to indicate a certain event type based on the event information.

19 Claims, 16 Drawing Sheets

(56) References Cited

U.S. PATENT DOCUMENTS

| | | | | |
|---|---|---|---|---|
| 2020/0174865 | A1* | 6/2020 | Kim | G06F 11/0793 |
| 2020/0379884 | A1* | 12/2020 | Jung | G11C 16/08 |
| 2021/0019218 | A1* | 1/2021 | Zhu | G06F 11/073 |
| 2021/0208966 | A1 | 7/2021 | Shim et al. | |
| 2022/0164249 | A1 | 5/2022 | Sassara et al. | |
| 2023/0026712 | A1* | 1/2023 | Noorudheen | G06F 11/073 |
| 2024/0061611 | A1* | 2/2024 | Liu | G06F 3/0658 |
| 2024/0231987 | A1* | 7/2024 | Park | G06F 11/0727 |

* cited by examiner

STORAGE DEVICE, METHOD OF OPERATING STORAGE DEVICE, AND METHOD OF OPERATING NON-VOLATILE MEMORY

CROSS-REFERENCE TO RELATED APPLICATION

This application is based on and claims priority under 35 U.S.C. § 119 to Korean Patent Application Nos. 10-2023-0004323, filed on Jan. 11, 2023 and 10-2023-0044359, filed on Apr. 4, 2023, in the Korean Intellectual Property Office, the contents of which are incorporated herein by reference in their entirety.

BACKGROUND

The inventive concepts relate to a semiconductor memory, and more particularly, to a storage device, a method of operating the storage device, and a method of operating a non-volatile memory.

Semiconductor memory devices are classified into volatile memory devices, such as static random access memory (SRAM) and dynamic random access memory (DRAM), in which stored data is lost when power supply is cut off, and non-volatile memory devices, such as flash memory device, phase-changed RAM (PRAM), magnetic RAM (MRAM), resistance RAM (RRAM), and ferroelectric RAM (FRAM), which retain stored data even when power supply is cut off.

Non-volatile memory devices perform overlapping operations to improve performance. Accordingly, it may be difficult to reproduce errors at a non-volatile memory level. Overlapping operations affect each other, and many types of errors may occur depending on the relationship between the overlapping operations. It may be difficult to check an error due to overlapping operations with a single operation in a non-volatile memory device. In addition, it may be difficult to determine the cause of an error by performing a scenario at a storage device level to reproduce the error.

SUMMARY

The inventive concepts provides a storage device for storing debugging data for failure analysis, a method of operating the storage device, and a method of operating a non-volatile memory.

According to some example embodiments, there is provided a method of operating a storage device including a storage controller and non-volatile memories, the method including detecting, by the storage controller, an event of a first non-volatile memory among the non-volatile memories, generating, by the storage controller, event information based on the detected event and transmitting, by the storage controller, the event information including an event type to the first non-volatile memory, generating, by the first non-volatile memory, internal information or data of the first non-volatile memory as debugging data in response to the event information, storing the debugging data by the first non-volatile memory, and updating, by the first non-volatile memory, an event flag to indicate a certain event type based on the event information.

According to some example embodiments, there is provided a method of operating a non-volatile memory, the method including receiving event information including an event type from an external storage controller through a control signal or a data signal, switching from a first mode to a second mode in response to the event information, storing at least one of command/address information, feature information, and E-FUSE information among debugging data, and updating an event flag based on the event type included in the event information.

According to some example embodiments, there is provided a storage device including a plurality of non-volatile memories, and a storage controller, wherein the storage controller is configured to detect an event of a first non-volatile memory among the plurality of non-volatile memories, generate event information based on the detected event, and transmit the event information including an event type to the first non-volatile memory, and the first non-volatile memory among the plurality of non-volatile memories is configured to switch from a first mode to a second mode in response to the event information, generate and store debugging data in the second mode, and update an event flag to indicate the event type included in the event information, wherein the debugging data includes at least one of command/address information, feature information, and E-FUSE information.

BRIEF DESCRIPTION OF THE DRAWINGS

Example embodiments will be more clearly understood from the following detailed description taken in conjunction with the accompanying drawings in which.

DETAILED DESCRIPTION

Figure 1:
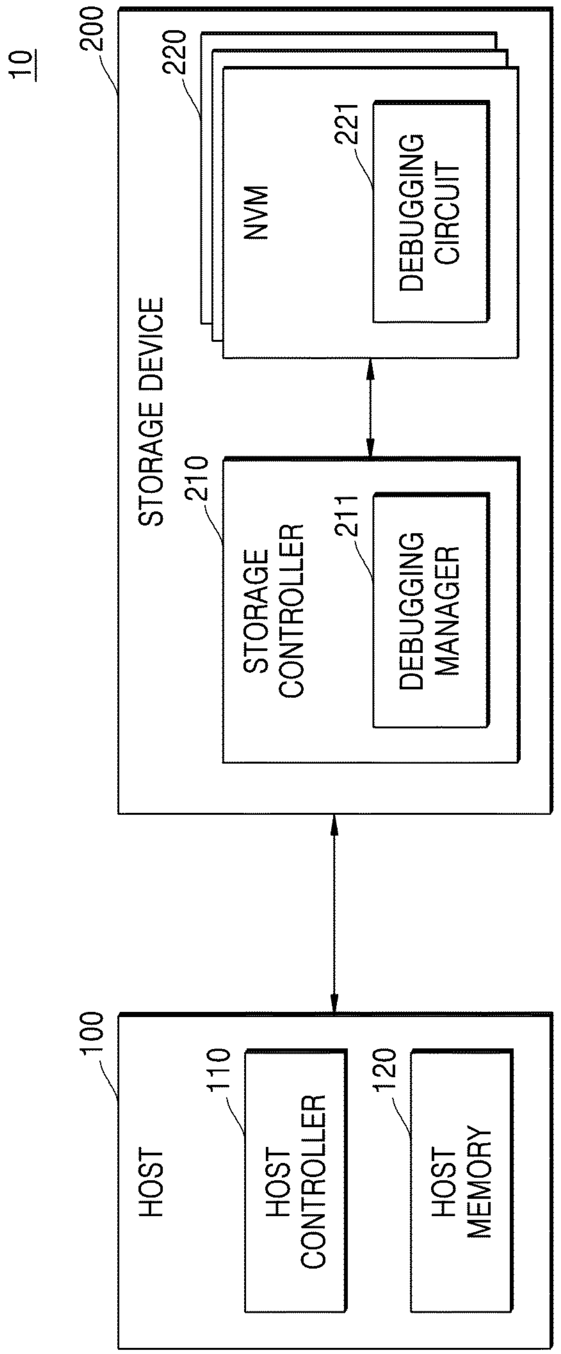
FIG. 1 is a block diagram of a storage system according to some example embodiments.

The present inventive concepts will be described more fully hereinafter with reference to the accompanying drawings, in which some example embodiments of the present inventive concepts are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps, and/or operations, these terms are only used to distinguish one element, component, step or operation from another element, component, step, or operation.

FIG. 1 is a block diagram of a storage system 10 according to some example embodiments. Referring to FIG. 1, the storage system 10 includes a host 100 and a storage device 200. The storage system 10 may be implemented as an electronic device, such as a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book, but example embodiments are not limited thereto. In addition, the storage system 10 may be implemented as various types of electronic devices, for example, a wearable device, such as a wrist watch or a head-mounted display (HMD).

The host 100 may control a data processing operation of the storage device 200, e.g., a data read operation or data write operation. The host 100 may refer to a data processing device capable of processing data, such as a central processing unit (CPU), a processor, a microprocessor, or an application processor (AP). The host 100 may execute an operating system (OS) and/or various application programs.

Specifically, the host 100 may include a host controller 110 and a host memory 120. The host controller 110 may be a device configured to control overall operations of the host 100 or to control the storage device 200. The host memory 120 may be a buffer memory, cache memory, or operation memory used in the host 100.

In some example embodiments, the host memory 120 may function as a buffer memory for temporarily storing data to be transmitted to the storage device 200 or data transmitted from the storage device 200. The host 100 may transmit a request to the storage device 200 and receive a response from the storage device 200. For example, when the request is a write request, the request may include write data. For example, when the request is a read request, a response to the request may include read data.

In some example embodiments, the host 100 may request debugging data from the storage device 200 for failure analysis. The host 100 may perform a debugging operation on the storage device 200 based on the debugging data.

The storage device 200 may operate under the control of the host 100. The storage device 200 may include a storage controller 210 and a non-volatile memory device 220. The storage controller 210 may perform various management operations for efficiently using the non-volatile memory device 220. The non-volatile memory device 220 may include a plurality of non-volatile memories NVM.

The storage device 200 may receive a request REQ from the host 100 and transmit a response RSP to the host 100. For example, when the request REQ is a write request, the storage controller 210 may control the non-volatile memory device 220 to write data to the non-volatile memory device 220 in response to the write request from the host 100. For example, when the request REQ is a read request, the storage controller 210 may control the non-volatile memory device 220 to read data stored in the non-volatile memory device 220 in response to the read request from the host 100.

In some example embodiments, when the non-volatile memory device 220 includes a flash memory, the flash memory may include a 2D NAND memory array or a 3D (or vertical) NAND (VNAND) memory array. In some example embodiments, the storage device 200 may include other various types of non-volatile memories. For example, the storage device 200 may include a magnetic RAM (MRAM), a spin-transfer torque MRAM, a conductive bridging RAM (CBRAM), a ferroelectric RAM (FeRAM), a phase RAM (PRAM), a resistive RAM, and/or other various types of memory, but example embodiments are not limited thereto.

In some example embodiments, when an event (or error or failure) occurs, the storage device 200 may store data or information owned (or possessed) by the storage controller 210 and data or information owned by the non-volatile memory device 220. When an event occurs, the storage device 200 may store internal information or data of the non-volatile memory device 220 at that moment. The storage device 200 may store internal information or data of the non-volatile memory device 220 in the form of a snapshot when an error occurs.

In some example embodiments, the storage controller 210 may include a debugging manager 211. For example, the debugging manager 211 may be implemented as a respective processing circuitry such as hardware (e.g., logic circuits) or a combination of hardware and software (e.g., a computer-based electronic system like a processor executing instruction codes or program routines (e.g., a software program)). The instruction codes or the program routines may be stored in any storage device located inside or outside the computer-based electronic system. The debugging manager 211 may control the storage controller 210 or the non-volatile memory device 220 to generate debugging data and store the generated debugging data in the non-volatile memory device 220. For example, the debugging data may indicate data necessary for failure analysis. For example, the debugging data may include command/address information, feature information, E-FUSE (electronic fuse) information, read/write data, copy data, internal setting information, internal configuration information, or the like, but example embodiments are not limited thereto. The debugging data may include a plurality of pieces of information (e.g., first information to fifth information). For example, the first information may be command/address information, the second information may be feature information, the third information may be E-FUSE information, the fourth information may be write data, and the fifth information may be copy data.

In some example embodiments, the debugging manager 211 may determine whether an event (or error) occurs. For example, the debugging manager 211 may detect an event. When an event occurs, the debugging manager 211 may transmit event information to the non-volatile memory device 220. The debugging manager 211 may transmit event information and control the non-volatile memory device 220 to enter a debugging mode. The debugging manager 211 may control the non-volatile memory device 220 to store debugging data. The debugging manager 211 may request event flag information and debugging information from the non-volatile memory device 220.

In some example embodiments, each of the non-volatile memories NVM may include a debugging circuit 221. The debugging circuit 221 may be implemented as a processing circuitry such as hardware (e.g., logic circuits) or a combination of hardware and software (e.g., a computer-based electronic system like a processor executing instruction codes or program routines (e.g., a software program)). The instruction codes or the program routines may be stored in any storage device located inside or outside the computer-based electronic system. The debugging circuit 221 may generate and store debugging data. The debugging circuit 221 may generate debugging data and store the debugging data under the control of the storage controller 210. The debugging circuit 221 may selectively store information based on event information. The debugging circuit 221 may update an event flag. The debugging circuit 221 may output event flag information and debugging data to the storage controller 210 according to a request of the storage controller 210.

The storage device 200 may transmit debugging data for defect analysis to the host 100. The storage device 200 may provide data or information provided from the storage controller 210 to the non-volatile memory device 220 as debugging data when an event occurs. The storage device 200 may provide internal information or data of the non-volatile memory device 220 at the time of event occurrence as debugging data. The storage device 200 may provide data or information held by the storage controller 210 as debugging data.

The storage device 200 may provide data of the storage controller 210 to the host 100 for failure analysis. It may be difficult for the host 100 to smoothly perform a debugging operation only with limited information of the storage controller 210. However, the storage device 200 according to some example embodiments may provide not only data of the storage controller 210 but also internal information or data of the non-volatile memory device 220 to the host 100 as debugging data.

As described above, according to some example embodiment, the storage device 200 may store information necessary for analysis according to the failure condition of the non-volatile memories NVM. For example, the storage device 200 may store command/address information, feature information, read/write data, copy data, internal setting information, internal configuration information, or the like received by the non-volatile memories NVM. Accordingly, the storage device 200 may store and provide more accurate and specific information for defect analysis or debugging.

Hereinafter, for convenience of description, terms, such as 'error', 'event', and 'defect', are used interchangeably. These terms may have the same meaning or different meanings depending on the context of embodiments, and the meaning of each term will be understood according to the context of some example embodiments.

Figure 2:
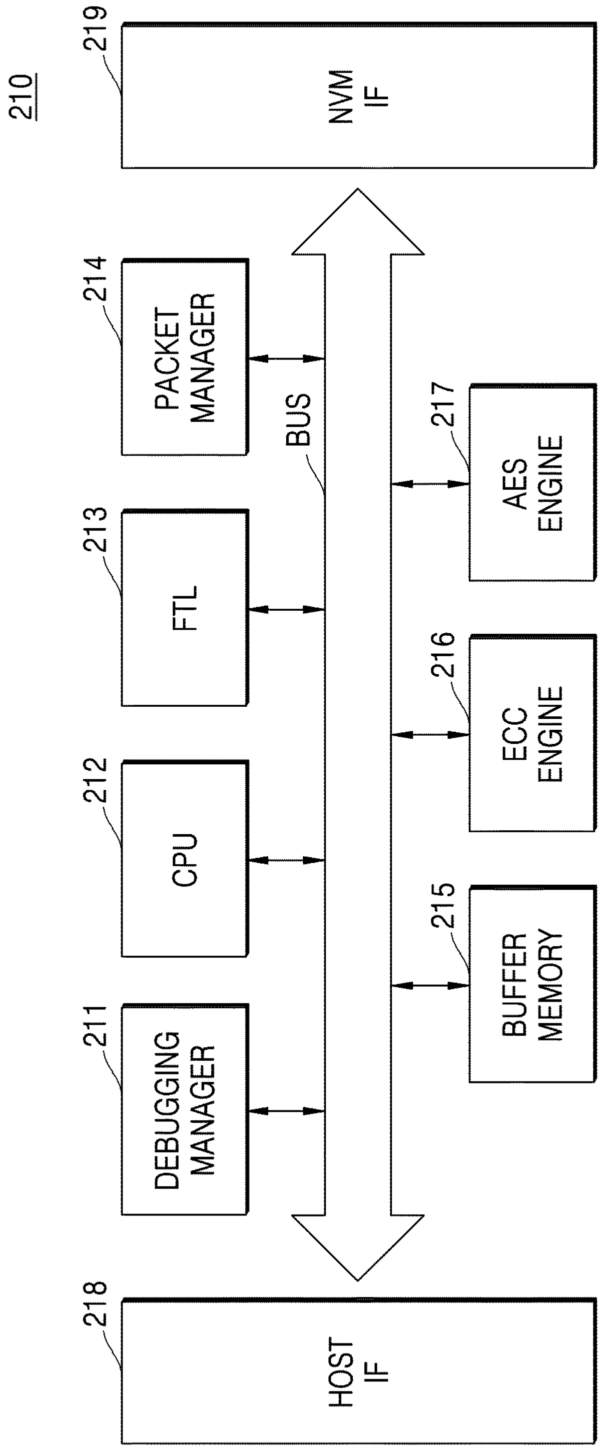
FIG. 2 is a block diagram of a storage controller of FIG. 1 according to some example embodiments.

FIG. 2 is a block diagram of the storage controller 210 of FIG. 1 according to some example embodiments. Referring to FIGS. 1 and 2, the storage controller 210 may include a debugging manager 211, a central processing unit (CPU) 212, a flash translation layer (FTL) 213, a packet manager 214, a buffer memory 215, an error correction code (ECC) engine 216, an advanced encryption standard (AES) engine 217, a host interface circuit 218, a non-volatile memory interface circuit 219, and a bus (BUS). For example, the flash translation layer (FTL) 213, the packet manager 214, the error correction code (ECC) engine 216, and the advanced encryption standard (AES) engine 217, may be implemented as a respective processing circuitry or as respective processing circuitries such as hardware (e.g., logic circuits) or a combination of hardware and software (e.g., a computer based electronic system like a processor executing instruction codes or program routines (e.g., a software program)). The instruction codes or the program routines may be stored in any storage device located inside or outside the computer-based electronic system.

In some example embodiments, the storage controller 210 may further include a working memory (not shown) into which the FTL 213 is loaded, and as the CPU 212 executes the FTL 213, data write and read operations on the non-volatile memory device 220 may be controlled.

In some example embodiments, the CPU 212 may be implemented as a multi-core processor, such as a dual-core processor or quad-core processor, but example embodiments are not limited thereto. The debugging manager 211, the FTL 213, and the packet manager 214 may be loaded into an operation memory of the storage controller 210. For example, the operation memory may be implemented with a volatile memory, such as SRAM or DRAM, or a non-volatile memory, such as flash memory or PRAM.

The FTL 213 may perform various functions, such as address mapping, wear-leveling, and garbage collection, but example embodiments are not limited thereto. The address mapping is an operation of changing a logical address received from the host 100 into a physical address used to actually store data in the non-volatile memory device 220. The wear-leveling is a technique for preventing excessive deterioration of a certain block by ensuring that blocks in the non-volatile memory device 220 are uniformly used. For example, the wear-leveling may be implemented through a firmware technology that balances erase counts of physical blocks. The garbage collection is a technique for securing usable capacity in the non-volatile memory device 220 by copying valid data of a block to a new block and then erasing the old block.

In some example embodiments, the packet manager 214 may generate a packet according to an interface protocol negotiated with the host 100 or parse various types of information from a packet received from the host 100. Also, in some example embodiments, the buffer memory 215 may temporarily store data to be written to the non-volatile memory device 220 or data to be read from the non-volatile memory device 220. The buffer memory 215 may be included in the storage controller 210, but may alternatively be disposed outside the storage controller 210.

In some example embodiments, the ECC engine 216 may perform error detection and correction functions for read data read from the non-volatile memory device 220. For example, the ECC engine 216 may generate parity bits for write data to be written in the non-volatile memory device 220, and the generated parity bits may be stored in the non-volatile memory device 220 together with the write data. When data is read from the non-volatile memory device 220, the ECC engine 216 may correct an error in the read data by using the parity bits read from the non-volatile memory device 220 together with the read data, and may output error-corrected read data.

In some example embodiments, the AES engine 217 may perform, by using a symmetric-key algorithm, at least one of an encryption operation and a decryption operation on data input to the storage controller 210.

In some example embodiments, the host interface circuit 218 may transmit and receive packets to and from the host 100. A packet transmitted from the host 100 to the host interface circuit 218 may include a command or data to be written to the non-volatile memory device 220, and a packet transmitted from the host interface circuit 218 to the host 100 may include a response to a command or data read from the non-volatile memory device 220.

In some example embodiments, the non-volatile memory interface circuit 219 may transmit data to be written to the non-volatile memory device 220 to the non-volatile memory device 220 or may receive data read from the non-volatile memory device 220. The non-volatile memory interface circuit 219 may be implemented to comply with standards, such as Toggle or Open NAND Flash Interface (ONFI), but example embodiments are not limited thereto.

In some example embodiments, the debugging manager 211 may control storing internal information and data of the non-volatile memory NVM as well as storing information, data, or logs of the storage controller 210 when an error occurs. In some example embodiments, the debugging manager 211 may detect that an event has occurred through a control signal CTRL or a data signal DQ. The storage controller 210 may detect an error or event through a status read command or a status check command. The storage controller 210 may detect an event based on status information provided by the non-volatile memory NVM in response to the status read command.

In some example embodiments, the debugging manager 211 may generate event information based on the detected event and transmit the event information to the non-volatile memory device 220. The event information may include a detected event type. For example, the event type may be at least one of the first to sixth events, but example embodiments are not limited thereto. For example, the first event may be a busy hang event, the second event may be an uncorrectable error correction code (UECC) event, the third event may be a status fail event, the fourth event may be a clean page event, the fifth event may be an erase fail event, and the sixth event may be a program fail event.

Figure 3:
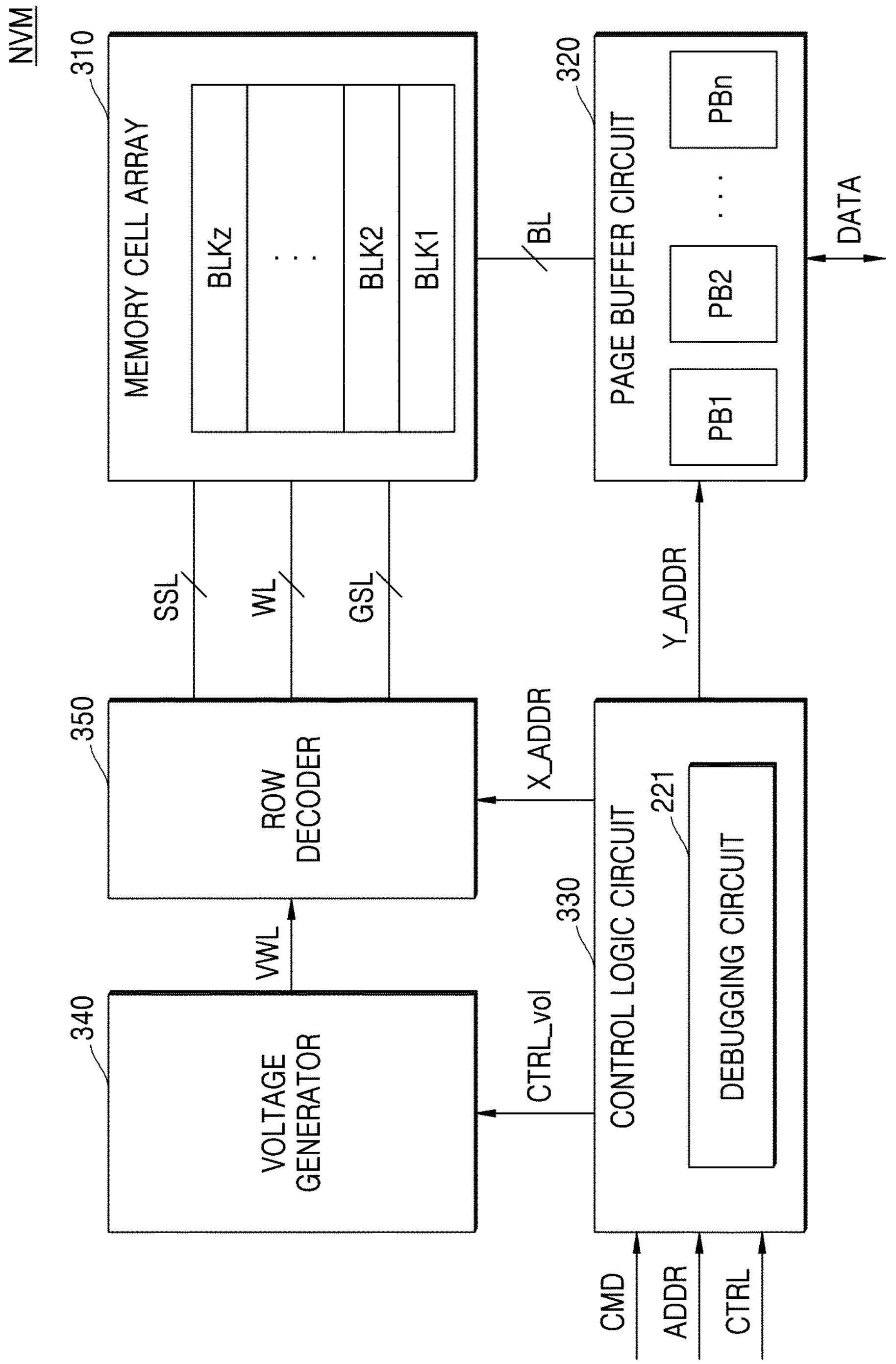
FIG. 3 is a block diagram of a non-volatile memory of FIG. 1 according to some example embodiments.

FIG. 3 is a block diagram of the non-volatile memory NVM of FIG. 1 according to some example embodiments. Referring to FIGS. 1 and 3, the non-volatile memory NVM may include a memory cell array 310, a page buffer circuit 320, a control logic circuit 330, a voltage generator 340, and a row decoder 350. The non-volatile memory NVM may correspond to an example embodiment of the non-volatile memory NVM of FIG. 1. Although not shown in FIG. 3, in some example embodiments, the non-volatile memory NVM may further include a column logic, a pre-decoder, a temperature sensor, a command decoder, an address decoder, and the like, but example embodiments are not limited thereto.

In some example embodiments, the memory cell array 310 may include a plurality of memory blocks BLK1 to BLKz. Each of the plurality of memory blocks BLK1 to BLKz may include a plurality of cell strings, and each of the plurality of cell strings may include a plurality of memory cells connected in series. The memory cell array 310 may be connected to the page buffer circuit 320 through bit lines BL, and may be connected to the row decoder 350 through word lines WL, string select lines SSL, and ground select lines GSL.

In some example embodiments, the memory cell array 310 may include a 3D memory cell array, and the 3D memory cell array may include a plurality of cell strings. Each cell string may include memory cells respectively connected to word lines vertically stacked on a substrate. U.S. Pat. Nos. 7,679,133, 8,553,466, 8,654,587, 8,559,235, and U.S. Patent Application Publication No. 2011/0233648 are incorporated herein by reference.

In some example embodiments, the memory cell array 310 may include a flash memory, and the flash memory may include a 2D NAND memory array or a 3D (vertical) NAND (VNAND) memory array. In some example embodiments, the memory cell array 310 may include MRAM, spin-transfer torque MRAM, CBRAM, FeRAM, PRAM, resistive RAM, and/or other various types of memory, but example embodiments are not limited thereto.

In some example embodiments, the page buffer circuit 320 may include a plurality of page buffers PB1 to PBn (n is an integer greater than or equal to 3), and the plurality of page buffers PB1 to PBn may be respectively connected to the memory cells through a plurality of bit lines BL. The page buffer circuit 320 may select at least one bit line from among the bit lines BL in response to a column address Y_ADDR. The page buffer circuit 320 may operate as a write driver or a sense amplifier according to an operation mode. For example, during a program operation, the page buffer circuit 320 may apply a bit line voltage corresponding to data to be programmed into a selected bit line. During a read operation, the page buffer circuit 320 may sense data stored in a memory cell by sensing a current or voltage of a selected bit line.

In some example embodiments, the control logic circuit 330 may generally control various operations in the non-volatile memory NVM. The control logic circuit 330 may output various control signals in response to the command CMD and/or the address ADDR. For example, the control logic circuit 330 may output a voltage control signal CTRL_vol, a row address X_ADDR, and a column address Y_ADDR.

In some example embodiments, the control logic circuit 330 may include a debugging circuit 221. The debugging circuit 221 may switch from a first mode to a second mode in response to received event information. The debugging circuit 221 may generate and store debugging data based on the event information. The debugging circuit 221 may select a type of information to be included in debugging data according to the event information. The debugging circuit 221 may output debugging data according to a request of the storage controller 210.

In some example embodiments, the voltage generator 340 may generate various types of voltages for performing program, read, and erase operations based on the voltage control signal CTRL_vol. For example, the voltage generator 340 may generate a program voltage, a read voltage, a program verify voltage, an erase voltage, and the like as a word line voltage VWL.

In some example embodiments, the row decoder 350 may select at least one of the plurality of word lines WL and one of the plurality of string selection lines SSL in response to the row address X_ADDR. For example, during a program operation, the row decoder 350 may apply word line voltages VWL to selected word lines during a search operation or a read operation.

Referring to FIGS. 1 and 3, in some example embodiments, the storage controller 210 may control the operation of the non-volatile memory NVM. For example, the storage controller 210 may provide a control signal CTRL and a data signal DQ to the non-volatile memory NVM through different signal lines or different signal pins to control the non-volatile memory NVM.

For example, the storage controller 210 may provide a chip enable signal CE/, a command latch enable signal CLE, an address latch enable signal ALE, a write enable signal WE/, a read enable signal RE/, a data strobe signal DQS, and a data signal DQ to the non-volatile memory NVM through different signal pins, but example embodiments are not limited thereto.

In some example embodiments, the chip enable signal CE/, the command latch enable signal CLE, the address latch enable signal ALE, the write enable signal WE/, the read enable signal RE/, and the data strobe signal DQS may be included in the control signal CTRL provided from the storage controller 210. The storage controller 210 may provide the control signal CTRL and the data signal DQ to the non-volatile memory NVM so that the non-volatile memory NVM performs various operations.

In some example embodiments, the storage controller 210 may provide the command CMD, the address ADDR, and data DATA to the non-volatile memory NVM through a data pin (DQ pin) to which the data signal DQ is provided. The storage controller 210 may receive stored data DATA from the non-volatile memory NVM through a data pin.

In some example embodiments, the storage controller 210 may transmit the data signal DQ to the non-volatile memory NVM to store the data DATA in the non-volatile memory NVM or output the data DATA from the non-volatile memory NVM. For example, the storage controller 210 may store the data DATA in the non-volatile memory NVM by providing the command CMD, the address ADDR, and the data DATA to the non-volatile memory NVM. The storage controller 210 may output data DATA from the non-volatile memory NVM by providing the command CMD and the address ADDR to the non-volatile memory NVM. The storage controller 210 may provide the control signal CTRL as well as the data signal DQ to the non-volatile memory NVM to store and output the data DATA.

In some example embodiments, the non-volatile memory NVM performs a corresponding operation in response to the control signal CTRL and the data signal DQ provided from the storage controller 210. For example, the non-volatile memory NVM may receive a data signal DQ including a command CMD and an address ADDR from the storage controller 210 and provide the stored data DATA to the storage controller 210.

In some example embodiments, the non-volatile memory NVM may distinguish whether a signal provided through the data signal DQ is the command CMD, the address ADDR, or the data DATA based on the control signal CTRL. For example, the non-volatile memory NVM may distinguish the type of the data signal DQ based on the chip enable signal CE/, the command latch enable signal CLE, the address latch enable signal ALE, the write enable signal WE/, the read enable signal RE/, and the data strobe signal DQS.

In some example embodiments, the non-volatile memory NVM may store data received from the storage controller 210 or transmit stored data to the storage controller 210, in response to various signals from the storage controller 210. In some example embodiments, when the non-volatile memory NVM performs a program operation or a read operation under the control of the storage controller 210, the non-volatile memory NVM may provide a ready/busy signal (R/B) (or status information) to the storage controller 210. For example, the ready/busy signal R/B may indicate a ready state or a busy state. The storage controller 210 may recognize that the non-volatile memory NVM is operating in response to the ready/busy signal R/B. In an embodiment, when the ready/busy signal R/B indicates a busy state, the storage controller 210 may not exchange information (command, address, data, etc.) with the non-volatile memory NVM.

In some example embodiments, the storage controller 210 may transmit event information to the non-volatile memory NVM through the control signal CTRL and the data signal DQ. The storage controller 210 may receive debugging information through the control signal CTRL and the data signal DQ.

The non-volatile memory NVM may receive event information through the control signal CTRL and the data signal DQ. The non-volatile memory (NVM) may transmit debugging information to the storage controller 210 through the control signal CTRL and the data signal DQ.

Figure 4:
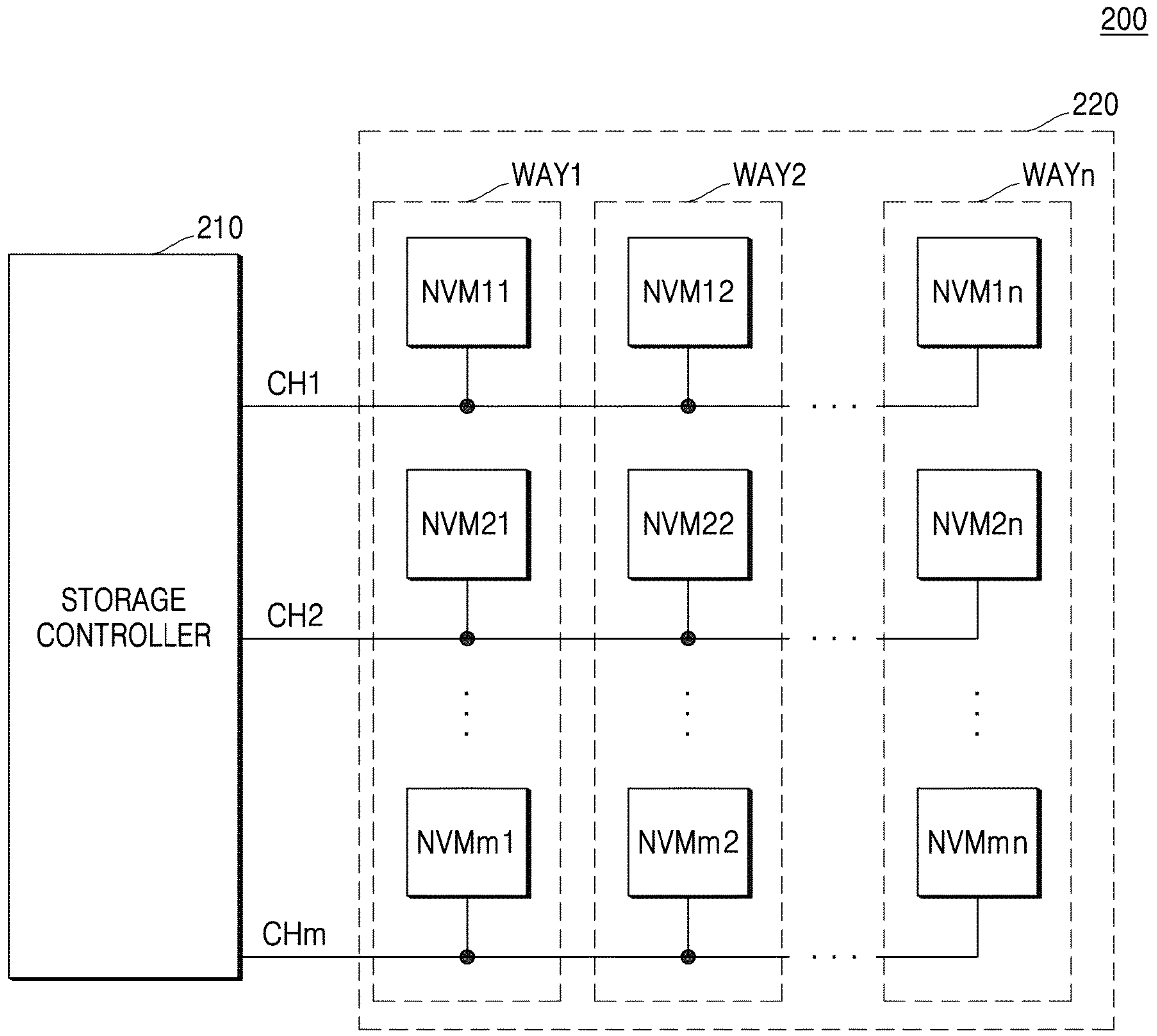
FIG. 4 is a diagram illustrating a storage device according to some example embodiments.

FIG. 4 is a diagram illustrating a storage device 200 according to some example embodiments. Referring to FIGS. 1 and 4, the storage device 200 may include a storage controller 210 and a non-volatile memory device 220. The non-volatile memory device 220 may include a plurality of non-volatile memories NVM11 to NVMmn.

In some example embodiments, the storage controller 210 may communicate with the plurality of non-volatile memories NVM11 to NVMmn through a plurality of channels CH1 to CHm. For example, a first part NVM11 to NVM1*n* of the plurality of non-volatile memories NVM11 to NVMmn may communicate with the storage controller 210 through a first channel CH1, and a second part NVM21 to NVM2*n* of the plurality of non-volatile memories NVM11 to NVMmn may communicate with the storage controller 210 through a second channel CH2. Because the remaining channels CH3 (not shown) to CHm are similar to this, a detailed description thereof is omitted.

In some example embodiments, the plurality of non-volatile memories NVM11 to NVMmn may be divided into a plurality of ways WAY1 to WAYn. For example, a plurality of non-volatile memories included in a first way WAY1 may be connected to the plurality of channels CH1 to CHm, respectively. Similarly, a plurality of non-volatile memories included in a plurality of ways WAY2 to WAYn may be connected to the plurality of channels CH1 to CHm, respectively. For example, the plurality of non-volatile memories NVM may be implemented as separate semiconductor dies, chips, packages, or modules, and may be distinguished from each other for each channel or each way.

Hereinafter, for convenience of description, it is assumed that an event occurs in a first non-volatile memory NVM11 among the plurality of non-volatile memories NVM11 to NVMmn. Also, it is assumed that a second non-volatile memory NVM21 among the plurality of non-volatile memories NVM11 to NVMmn is normal with no event occurring.

Figure 5:
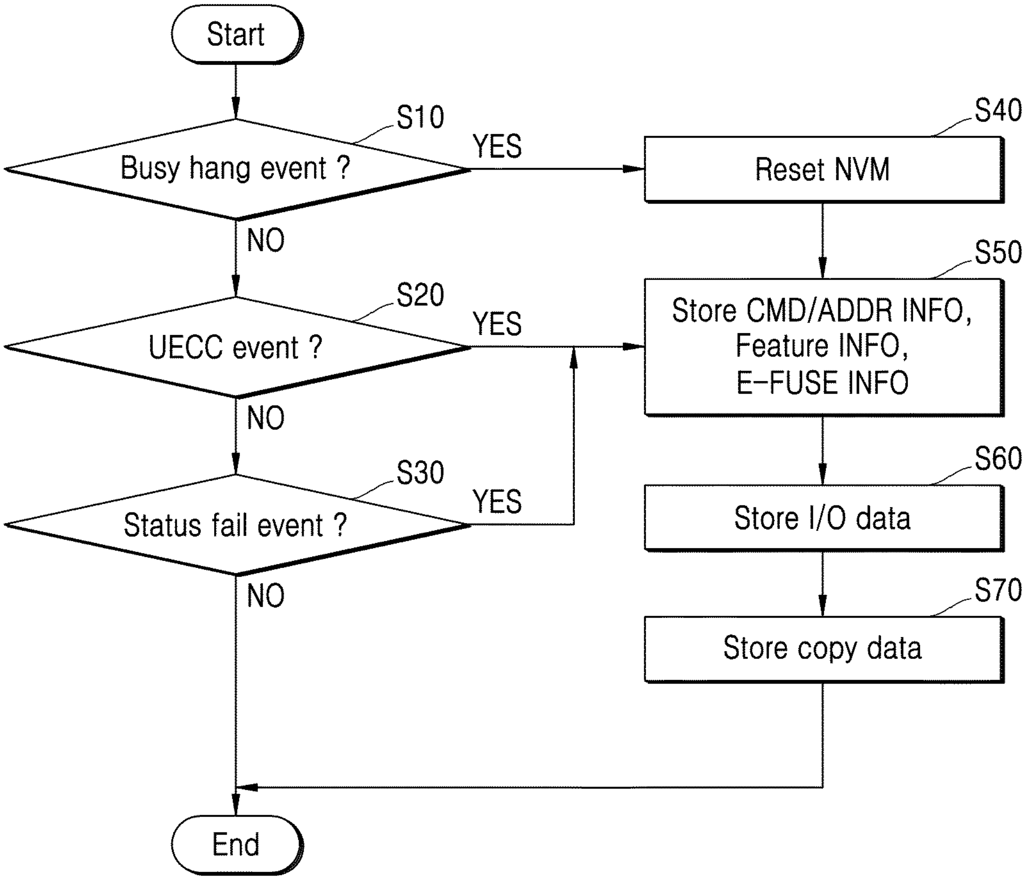
FIG. 5 is a flowchart illustrating an example of a method of operating a storage device of FIG. 1 according to some example embodiments.

FIG. 5 is a flowchart illustrating an example of a method of operating the storage device of FIG. 1 according to some example embodiments. Referring to FIGS. 1 and 5, in Operation S10, the storage device 200 may determine whether a busy hang event has occurred. For example, the storage device 200 may determine whether the first event has occurred.

For example, the storage device 200 may detect a busy hang event (e.g., in Operation S10) while performing an operation. When it is determined that a busy hang event has occurred, the storage device 200 performs Operation S40 (e.g., Reset NVM). When it is determined that no busy hang event has occurred (e.g., in Operation S10), the storage device 200 performs Operation S20 (e.g., the storage device 200 determines whether a UECC event has occurred).

In some example embodiments, the storage controller 210 may repeatedly transmit a status read command for a reference time (or a predetermined time). For example, the reference time may be previously set in an initialization process. The storage controller 210 may receive status information from the non-volatile memory NVM. During the reference time, when the status information indicates a busy state, the storage controller 210 may determine that a busy hang event has occurred (e.g., Operation S10). In other words, when status information indicating the ready state is not received during the reference time, the storage controller 210 may detect a busy hang event (e.g., Operation S10).

In some example embodiments, when status information indicating the busy state is continuously received during the reference time, the storage controller 210 may determine that there is a busy hang event (e.g., Operation S10). The storage controller 210 may detect a busy hang event (e.g., Operation S10) when the time for maintaining the busy state of the non-volatile memory NVM is longer than the reference time. In some example embodiments, while the non-volatile memory NVM remains busy (for example, when the non-volatile memory NVM does not perform an operation or does not stop for a reference time), the storage controller 210 may detect that a busy hang event has occurred (operation S10).

In some example embodiments, in Operation S20, the storage device 200 may determine whether a UECC event has occurred. For example, the storage device 200 may determine whether the second event has occurred. For example, the storage device 200 may determine that a clean page event has occurred as well as a UECC event. Alternatively, in some example embodiments, the storage device 200 may determine that a clean page event of a UECC event has occurred. The storage device 200 performs Operation S50 when it is determined that a UECC event has occurred. In some example embodiments, if it is determined that no UECC event has occurred, Operation S30 is performed.

In some example embodiments, in Operation S30, the storage device 200 may determine whether a status fail event has occurred. For example, the storage device 200 may determine whether the third event has occurred. For example, the storage device 200 may determine that an erase fail event of a status fail event has occurred. For example, the storage device 200 may determine that a program fail event of a status fail event has occurred. For example, the storage device 200 performs Operation S50 when it is determined that a status fail event has occurred. For example, when it is determined that the status fail event has not occurred, the storage device 200 may not perform Operations S40 to S70.

In some example embodiments, the storage controller 210 may identify an event according to a command transmitted immediately before a status read command. For example, when an erase command is transmitted before transmitting a status read command, the storage controller 210 may detect an erase fail event based on status information indicating a status failure. For example, the storage controller 210 may detect the fifth event. For example, when a program command is transmitted before transmitting a status read command, the storage controller 210 may detect a program fail event based on status information indicating a status failure. That is, the storage controller 210 may detect the sixth event.

In some example embodiments, the storage controller 210 may determine whether a command (or a command corresponding to an event) transmitted prior to the status read command is an erase command. When the command corresponding to the event is an erase command, the storage controller 210 may determine that an event, which has occurred, is an erase fail event. That is, the storage controller 210 may detect the fifth event.

In some example embodiments, when the command corresponding to the event is not an erase command, the storage controller 210 may determine whether the command corresponding to the event is a program command. When the command corresponding to the event is a program command, the storage controller 210 may determine that an event, which has occurred, is a program fail event. That is, the storage controller 210 may detect the sixth event.

For example, the command corresponding to the event may be a command transmitted immediately before the status read command. The command corresponding to the event may be a command immediately before repeatedly transmitting the status read command.

In some example embodiments, the storage controller 210 may determine that an event is a program fail event when the result of program operation deviates from a criterion for determining pass/fail of a program operation. For example, the storage controller 210 may detect a program fail event when receiving status information indicating a status fail.

In some example embodiments, the storage controller 210 may determine that an event is an erase fail event when the result of erase operation deviates from a criterion for determining pass/fail of an erase operation. For example, the storage controller 210 may detect an erase fail event when receiving status information indicating a status fail.

In some example embodiments, in Operation S40, the storage device 200 may reset the non-volatile memory NVM. For example, the storage controller 210 may transmit a reset command to the non-volatile memory NVM. After Operation S40, the storage device 200 may perform Operation S50.

In some example embodiments, the storage controller 210 may resolve the condition (or status) of a busy hang. The storage controller 210 may resolve a busy hang condition in order to store debugging information. The storage controller 210 may transmit a reset command to the non-volatile memory NVM to remove a busy hang event.

In some example embodiments, the non-volatile memory NVM may remove a busy hang event in response to the reset command. The non-volatile memory NVM may resolve a busy hang event without initializing internal information or internal data. When receiving a reset command in the second mode, the non-volatile memory NVM may not initialize internal information or data.

In some example embodiments, in Operation S50, the storage device 200 may store command/address information (e.g., CMD/ADDR INFO), feature information, E-FUSE information, and the like, but example embodiments are not limited thereto. The storage device 200 may program command/address information (e.g., CMD/ADDR INFO), feature information, E-FUSE information, and the like among debugging data into a dump area. In some example embodiments, after Operation S50, the storage device 200 performs Operation S60. For example, the dump area may be preset in an initialization operation.

In some example embodiments, in Operation S60, the storage device 200 may store input/output (I/O) data. For example, the storage device 200 may program input/output (I/O) data among debugging data into the dump area. For example, the non-volatile memory NVM may store write data received from the storage controller 210. For example, the non-volatile memory NVM may store read data to be output to the storage controller 210. For example, the non-volatile memory NVM may store data stored in the page buffer circuit 320.

In some example embodiments, in Operation S70, the storage device 200 may store copy data. For example, the storage device 200 may read data corresponding to an event and stored in a memory cell array and program the read data into a dump area.

According to some example embodiments, as described above, the storage device 200 may store internal data or information of the non-volatile memory NVM, e.g., debugging data, when an event occurs. The storage device 200 may identify an event and store information corresponding to the event.

In some example embodiments, when an error occurs, the non-volatile memory device 220 according to some example embodiments may store signals received from the storage controller 210 and internal information. For example, each of the non-volatile memory devices 220 may store input command/address log information when an event occurs. For example, when an event occurs, the non-volatile memory device 220 may store internal information indicating a state of the non-volatile memory device 220.

Figure 6:
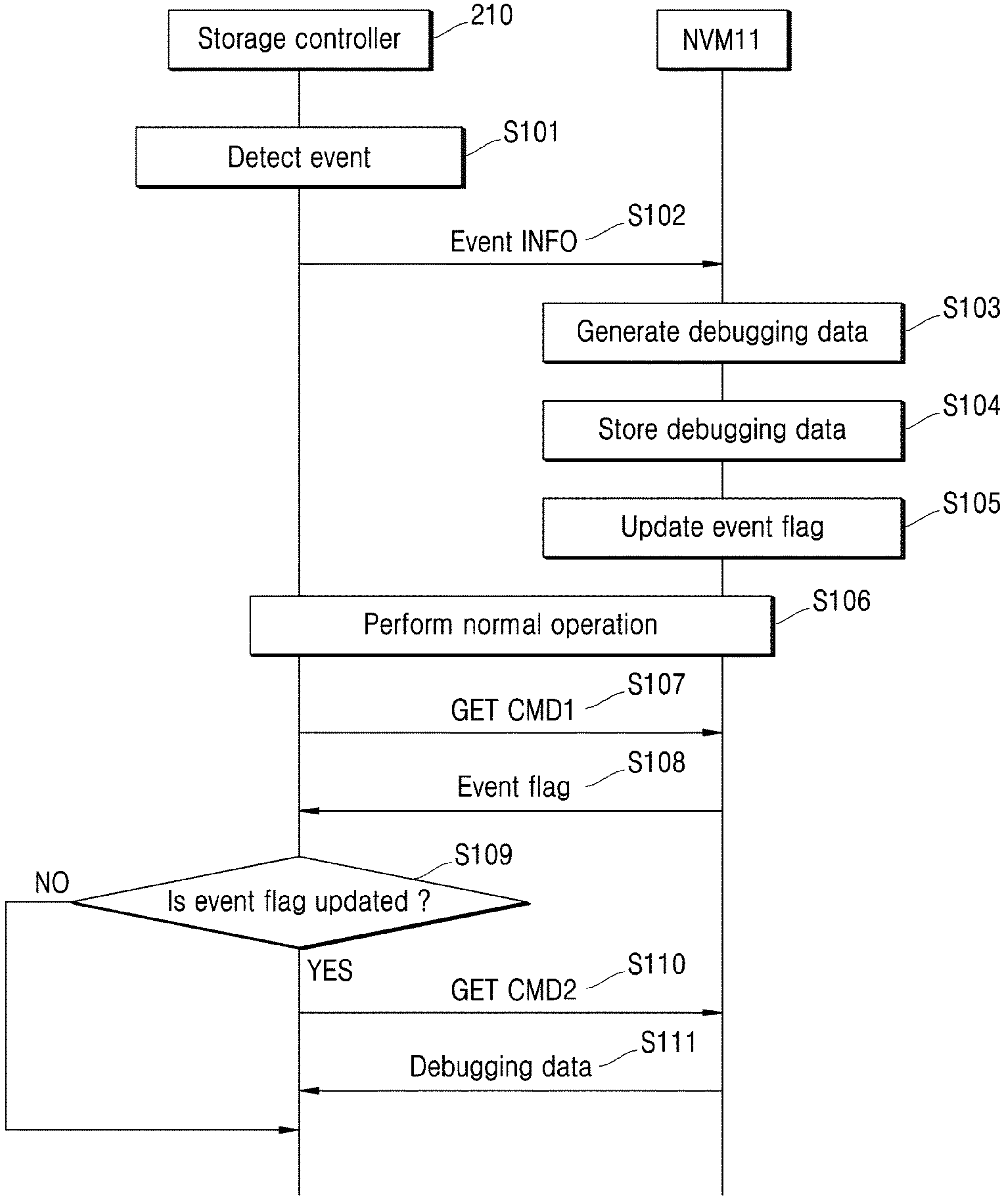
FIG. 6 is a flowchart illustrating an example of a method of operating the storage device of FIG. 1 according to some example embodiments.

FIG. 6 is a flowchart illustrating an example of a method of operating the storage device of FIG. 1 according to some example embodiments. Referring to FIGS. 1 and 6, in Operation S101, the storage controller 210 may detect an event. In some example embodiments, the storage controller 210 may detect an event (e.g., Operation S101) of the first non-volatile memory NVM11. For example, the storage controller 210 may detect at least one of the first to sixth events.

In some example embodiments, the storage controller 210 may detect whether an event has occurred by using a status read command (e.g., '70h'). Alternatively, in some example embodiments, the storage controller 210 may detect an event through a ready/busy signal R/B.

For example, the storage controller 210 may transmit a status read command to the non-volatile memory device 220. The non-volatile memory device 220 may transmit status information to the storage controller 210 in response to a status read command. The storage controller 210 may determine whether an event has occurred based on the received status information.

For example, the storage controller 210 may repeatedly transmit a status read command for a predetermined time (or reference time). When the status information remains busy for a predetermined time, the storage controller 210 may determine that the first event has occurred.

In some example embodiments, after transmitting an erase command, the storage controller 210 may transmit a status read command to the non-volatile memory device 220. The non-volatile memory device 220 may transmit status information indicating a fail state to the storage controller 210. When status information received after transmission of the erase command indicates a fail state, the storage controller 210 may determine that the third event or the sixth event has occurred.

In some example embodiments, after transmitting a program command, the storage controller 210 may transmit a status read command to the non-volatile memory device 220. The non-volatile memory device 220 may transmit status information indicating a fail state to the storage controller 210. When status information received after transmission of the program command indicates a fail state, the storage controller 210 may determine that the third event or the sixth event has occurred.

In some example embodiments, the storage controller 210 may receive read data from the non-volatile memory device 220 after transmitting a read command. The storage controller 210 may determine whether there is an error based on the read data. When there is an error in read data, the storage controller 210 may determine that the second event or the fourth event has occurred.

In some example embodiments, in Operation S102, the storage controller 210 may transmit event information to the first non-volatile memory NVM11. In some example embodiments, the storage controller 210 may generate event information based on a detected event and transmit the event information to the first non-volatile memory NVM11 (e.g., Operation S102). For example, the event information may be information for identifying an event that has occurred. For example, the event information may include an event type. For example, the event information may be a request or command for controlling the first non-volatile memory NVM11 to generate and store debugging data. In some example embodiments, the storage controller 210 may transmit event information to the first non-volatile memory NVM11 through a control signal CTRL or a data signal DQ.

In some example embodiments, in Operation S103, the first non-volatile memory NVM11 may generate debugging data. In some example embodiments, the first non-volatile memory NVM11 may switch from the first mode to the second mode in response to the event information. For example, the first mode may indicate a normal mode, and the second mode may indicate a debugging mode. The first non-volatile memory NVM11 may generate debugging data in the second mode.

In some example embodiments, the first non-volatile memory NVM11 may generate internal information or internal data of the first non-volatile memory NVM11 as debugging data in response to the event information (e.g., Operation S103). For example, the debugging data may include at least one of command/address log information, feature information, E-FUSE information, write data, read data, and copy data, but example embodiments are not limited thereto.

In some example embodiments, the first non-volatile memory NVM11 may select data (e.g., debugging data) to be stored based on the event information. The types of information included in the debugging data stored according to the event information may be different. For example, the first non-volatile memory NVM11 may store first debugging data corresponding to a first event type, based on the first event type included in the event information. For example, the first non-volatile memory NVM11 may store second debugging data corresponding to a second event type, based on the second event type included in the event information. The second event type may be different from the first event type. For example, the first debugging data may include first information, and the second debugging data may include second information different from the first information.

In other words, for example, when the first event type indicates the first event, the first debugging data may include command/address information, feature information, and E-FUSE information. When the second event type indicates the second event, the second debugging data may include copy data, command/address information, feature information, and E-FUSE information.

In some example embodiments, in Operation S104, the first non-volatile memory NVM11 may store debugging data. The first non-volatile memory NVM11 may program debugging data into the memory cell array 310. In some example embodiments, the first non-volatile memory NVM11 may set a dump area in the memory cell array 310 in an initialization operation. In some example embodiments, the first non-volatile memory NVM11 may write debugging data in a preset dump area. In some example embodiments, the first non-volatile memory NVM11 may store debugging data in registers.

In some example embodiments, in Operation S105, the first non-volatile memory NVM11 may update an event flag. For example, the first non-volatile memory NVM11 may update an event flag based on event information. In some example embodiments, the first non-volatile memory NVM11 may update an event flag to indicate a certain event type.

In some example embodiments, in Operation S106, the storage controller 210 and the first non-volatile memory NVM11 may perform a normal operation. For example, the first non-volatile memory NVM11 may change the second mode to the first mode after updating the event flag. For example, the first non-volatile memory NVM11 may switch from a debugging mode to a normal mode. The storage device 200 may read or write data in response to a request received from the host 100.

In some example embodiments, in Operation S107, the storage controller 210 may transmit a first acquisition command GET CMD1 to the first non-volatile memory NVM11. The storage controller 210 may transmit a command requesting event flag information to the first non-volatile memory NVM11. For example, the first acquisition command GET CMD1 may include an identifier indicating event flag information. The storage controller 210 may transmit the first acquisition command GET CMD1 through the control signal CTRL or the data signal DQ.

In some example embodiments, in Operation S108, the first non-volatile memory NVM11 may transmit event flag information to the storage controller 210. In some example embodiments, the first non-volatile memory NVM11 may transmit stored event flag information in response to the first acquisition command GET CMD1. For example, when the first non-volatile memory NVM11 does not receive event information, the first non-volatile memory NVM11 may transmit event flag information having a preset initialization value. For example, when event information is received, the first non-volatile memory NVM11 may generate and transmit event flag information based on an updated event flag. For example, the first non-volatile memory NVM11 may transmit the event flag information through the control signal CTRL or the data signal DQ.

In some example embodiments, in Operation S109, the storage controller 210 may determine whether the event flag information has been updated. For example, when the event flag information is updated, the storage device 200 may perform Operations S110 and S111. For example, when the event flag information is not updated, the storage device 200 may not perform Operations S110 and S111. For example, the storage device 200 may determine whether an event has occurred or whether there is debugging data through the event flag information. When the event flag information is updated, the storage device 200 may determine that there is debugging data to be requested.

In some example embodiments, in Operation S110, the storage controller 210 may transmit a second acquisition command GET CMD2 to the first non-volatile memory NVM11. For example, the storage controller 210 may transmit a command requesting debugging data to the first non-volatile memory NVM11. For example, the second acquisition command GET CMD2 may include an identifier indicating debugging information. The storage controller 210 may transmit the second acquisition command GET CMD2 through the control signal CTRL or the data signal DQ.

In some example embodiments, in Operation S111, the first non-volatile memory NVM11 may transmit debugging data to the storage controller 210. In some example embodiments, the first non-volatile memory NVM11 may transmit debugging data including command/address information, feature information, E-FUSE information, and the like in response to the second acquisition command GET CMD2. The first non-volatile memory NVM11 may transmit debugging data through the control signal CTRL or the data signal DQ.

As described above, the storage device 200 according to some example embodiments may identify the error type of the non-volatile memory NVM during operation. Based on the identified error type, the storage controller 210 may transmit corresponding event information to the non-volatile memory NVM. The non-volatile memory NVM may store internal information or internal data based on the event information. That is, for example, the storage device 200 may generate and store internal information and data of the non-volatile memory NVM at the time of error occurrence as debugging data. Accordingly, during failure analysis, information or data of the non-volatile memory NVM that is difficult to check during operation of the storage device 200 may be analyzed. This may identify the cause of the error and facilitate failure analysis. Also, it may shorten the failure analysis time.

Figure 7:
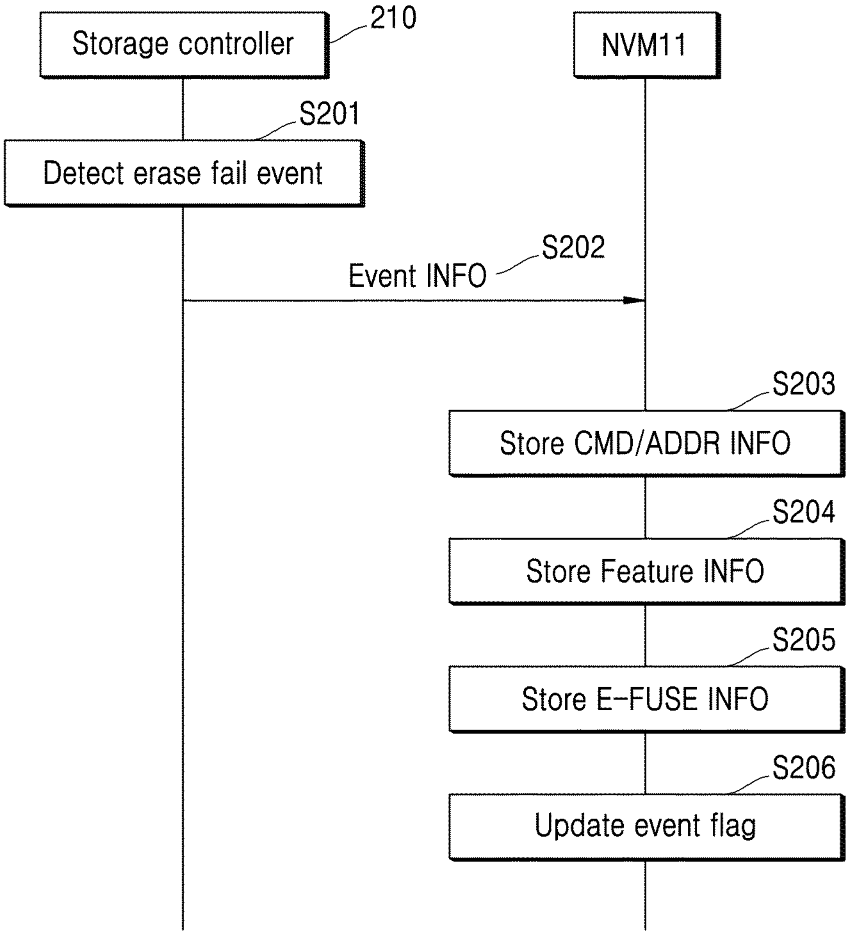
FIG. 7 is a flowchart illustrating an example of a method of operating the storage device of FIG. 1 according to some example embodiments.

FIG. 7 is a flowchart illustrating an example of a method of operating the storage device of FIG. 1 according to some example embodiments. Referring to FIGS. 1 and 7, in some example embodiments, in Operation S201, the storage controller 210 may detect an erase fail event. That is, for example, the storage controller 210 may detect the fifth event among a plurality of events. For example, the storage controller 210 may transmit an erase command to the first non-volatile memory NVM11. The storage controller 210 may transmit a status read command to the first non-volatile memory NVM11 to check the status thereof.

In some example embodiments, the first non-volatile memory NVM11 may perform an erase operation in response to an erase command. For example, an error may occur in the first non-volatile memory NVM11 during an erase operation. That is, an erase fail may occur in the first non-volatile memory NVM11. In some example embodiments, when an erase fail occurs, the first non-volatile memory NMV1 may transmit status information indicating a fail state to the storage controller 210 in response to the status read command. When status information is received in response to a status read command transmitted after an erase command, the storage controller 210 may detect that an erase fail event has occurred based on the status information indicating a fail state.

In some example embodiments, in Operation S202, the storage controller 210 may transmit event information to the first non-volatile memory NVM11 in response to the erase fail event. For example, the storage controller 210 may transmit event information including an event type indicating the fifth event (e.g., an erase fail event) to the first non-volatile memory NVM11.

In some example embodiments, in Operation S203, the first non-volatile memory NMV11 may store command/address information (e.g., CMD/ADDR INFO). For example, the first non-volatile memory NVM11 may switch from the first mode to the second mode based on the event information. For example, in the second mode, the first non-volatile memory NVM11 may generate and store first information, for example, command/address information (e.g., CMD/ADDR INFO), among debugging data. The first non-volatile memory NVM11 may store the command/address information (e.g., CMD/ADDR INFO) in a dump area. The first non-volatile memory NVM11 may generate the first information based on command and address information corresponding to an erase fail event. The first non-volatile memory NVM11 may generate the first information based on command and address information (e.g., CMD/ADDR INFO) currently being processed in the first non-volatile memory NVM11. The first non-volatile memory NVM11 may generate the first information based on command and address information (e.g., CMD/ADDR INFO) recently input into the first non-volatile memory NVM11. The first non-volatile memory NVM11 may program the first information into a memory cell array.

In some example embodiments, in Operation S204, the first non-volatile memory NVM11 may store feature information. The first non-volatile memory NVM11 may generate and store second information, for example, feature information, among debugging data. The storage controller 210 may set the features of the first non-volatile memory NVM11 through a set feature command and a feature address. The first non-volatile memory NVM11 may store set features in registers. The first non-volatile memory NVM11 may generate second information based on the features stored in the registers. The first non-volatile memory NVM11 may program the second information into the memory cell array. For example, the feature information may include information about a timing mode, an output drive strength, a ready/busy pull-down strength, an array operation mode, and the like, but example embodiments are not limited thereto. In some example embodiments, the feature information may be changed by a user.

In some example embodiments, in Operation S205, the first non-volatile memory NVM11 may store E-FUSE information. The first non-volatile memory NVM11 may generate and store third information, for example, E-FUSE information, among debugging data. In some example embodiments, the first non-volatile memory NVM11 may generate the third information based on data stored in E-FUSE of the first non-volatile memory NVM11. The first non-volatile memory NVM11 may program the third information into the memory cell array. For example, the E-FUSE information may be non-volatile memory operation setting information or non-volatile memory option information. In other words, for example, the E-FUSE information may be information related to setting an operation of the non-volatile memory NVM.

In some example embodiments, the data stored in the E-FUSE may include setting values, for example, options/time/analog levels related to the non-volatile memory NVM, but example embodiments are not limited thereto. The data stored in the E-FUSE may include setting values related to conditions required for non-volatile memory NVM to operate. In some example embodiments, by applying optimal conditions through the data stored in the E-FUSE, the non-volatile memory NVM may satisfy reliability or performance required by users. For example, the data stored in the E-FUSE may not be changed by users. For example, the data stored in the E-FUSE may be set during manufacturing.

In some example embodiments, the data stored in the E-FUSE may be changed by the storage controller 210. The data stored in the E-FUSE may include data changed by the storage controller 210 to improve performance or reliability.

In some example embodiments, in Operation S206, the first non-volatile memory NVM11 may update an event flag. The first non-volatile memory NVM11 may update an event flag based on event information. In some example embodiments, the first non-volatile memory NVM11 may update an event flag to indicate an erase fail event.

Figure 8:
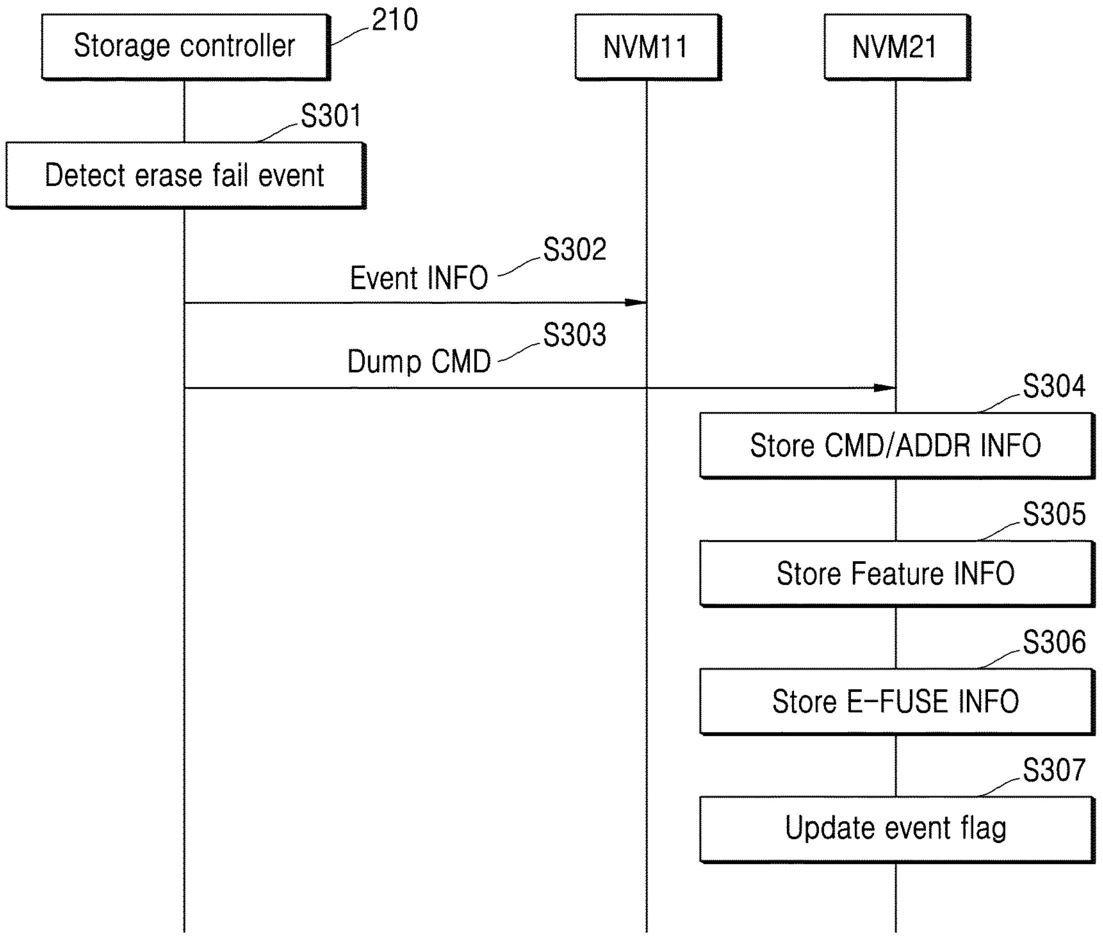
FIG. 8 is a flowchart illustrating an example of a method of operating the storage device of FIG. 1 according to some example embodiments.

FIG. 8 is a flowchart illustrating an example of a method of operating the storage device of FIG. 1 according to some example embodiments. A method of storing debugging data of a non-volatile memory NVM (e.g., the second non-volatile memory NVM21) in which no error has occurred, according to some example embodiments, will be described with reference to FIG. 8.

In some example embodiments, in Operation S301, the storage controller 210 may detect an erase fail event. For example, the storage controller 210 may detect the fifth event. In some example embodiments, in Operation S302, the storage controller 210 may transmit event information including an event type indicating the fifth event to the first non-volatile memory NVM11. Operations S301 and S302 are the same as or similar to Operations S201 and S202 of FIG. 7, and thus, detailed descriptions thereof are omitted. As described above with reference to FIG. 7, the first non-volatile memory NVM11 may generate and store first to third information in response to event information, and update an event flag (not shown).

In some example embodiments, in Operation S303, the storage controller 210 may transmit a dump command (e.g., Dump CMD) to the second non-volatile memory NVM21. The dump command may be a command that commands (and/or requests) the generation and storing of debugging data. In some example embodiments, the dump command may include an identifier of a non-volatile memory in which an event has occurred, and event information. For example, the dump command may include an identifier of the first non-volatile memory and an event type indicating the fifth event.

In some example embodiments, an erase fail event occurs in the first non-volatile memory NVM11, but at the same time, the storage controller 210 may transmit a command to the second non-volatile memory NVM21 to generate and store debugging data of the second non-volatile memory NVM21. For example, the storage controller 210 may transmit a dump command to the second non-volatile memory NVM21 through the control signal CTRL or the data signal DQ.

In some example embodiments, in Operation S304, the second non-volatile memory NVM21 may store command/address information (e.g., CMD/ADDR INFO). In some example embodiments, the second non-volatile memory NVM21 may switch from the first mode to the second mode in response to the dump command. The second non-volatile memory NVM21 may generate and store first information among debugging data in response to a dump command.

In some example embodiments, in Operation S305, the second non-volatile memory NVM21 may store feature information. The second non-volatile memory NVM21 may generate and store second information among debugging data. In some example embodiments, in Operation S306, the second non-volatile memory NVM21 may store E-FUSE information. The second non-volatile memory NVM21 may generate and store third information among debugging data.

In some example embodiments, in Operation S307, the second non-volatile memory NVM21 may update an event flag. For example, the second non-volatile memory device NVM21 may update an event flag based on a dump command. The second non-volatile memory NVM21 may update an event flag to indicate the fifth event. The second non-volatile memory NVM21 may store an identifier corresponding to the first non-volatile memory NVM11 and an event flag. In some example embodiments, the second non-volatile memory NVM21 may generate and store debugging data in the second mode, and then switch from the second mode to the first mode.

As described above, in some example embodiments, when an error occurs in the first non-volatile memory NVM11, the storage device 200 may store debugging data of the first non-volatile memory NVM11 in the first non-volatile memory NVM11 and store debugging data of the second non-volatile memory NVM21 in the second non-volatile memory NVM21. The storage device 200 may store not only debugging data of the first non-volatile memory NVM11 with an error, but also debugging data of the second non-volatile memory NVM21 without an error.

Figure 9:
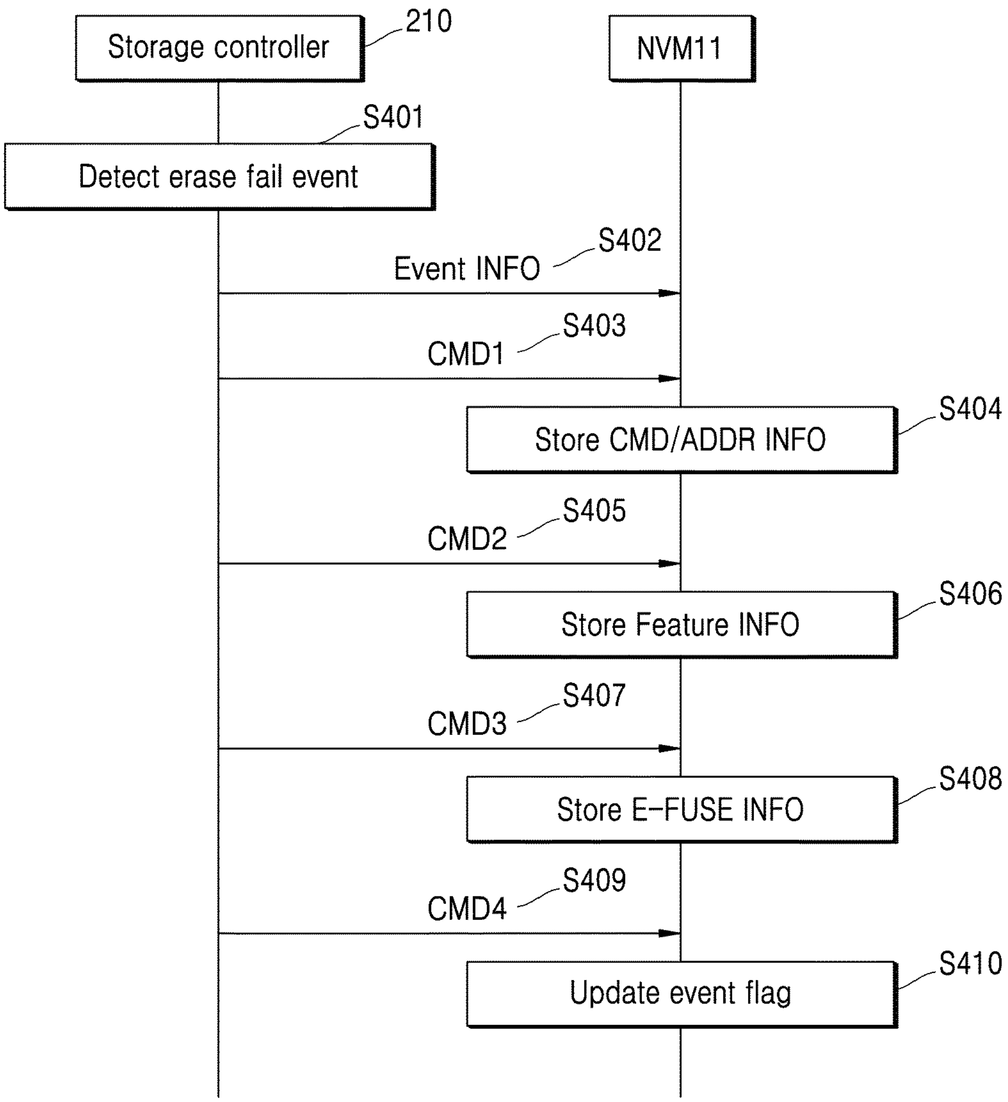
FIG. 9 is a flowchart illustrating an example of a method of operating the storage device of FIG. 1 according to some example embodiments.

FIG. 9 is a flowchart illustrating an example of a method of operating the storage device of FIG. 1 according to some example embodiments. A method of storing debugging data in the first non-volatile memory NVM11 under the control of the storage controller 210 according to some example embodiments will be described with reference to FIG. 9.

Referring to FIG. 7, the first non-volatile memory NVM11 may itself generate and store debugging data in response to event information. On the other hand, referring to FIG. 9, the first non-volatile memory NVM11 may generate and store debugging data under the control of the storage controller 210.

In some example embodiments, in Operation S401, the storage controller 210 may detect an erase fail event (i.e., the fifth event). In some example embodiments, in Operation S402, the storage controller 210 may transmit event information including an event type indicating the fifth event to the first non-volatile memory NVM11. Operations S401 and S402 are the same as or similar to Operations S201 and S202 of FIG. 7, and thus, detailed descriptions thereof are omitted. The first non-volatile memory NVM11 may switch from the first mode to the second mode in response to the event information.

In some example embodiments, in Operation S403, the storage controller 210 may transmit a first command CMD1 to the first non-volatile memory NVM11. For example, the first command CMD1 may be a command to store command/address information.

In some example embodiments, in Operation S404, the first non-volatile memory NVM11 may store the command/address information (e.g., CMD/ADDR INFO). The first non-volatile memory NVM11 may generate and store first information among debugging data in response to the first command CMD1.

In some example embodiments, in Operation S405, the storage controller 210 may transmit a second command CMD2 to the first non-volatile memory NVM11. For example, the second command CMD2 may be a command to store feature information.

In some example embodiments, in Operation S406, the first non-volatile memory NVM11 may store feature information. The first non-volatile memory NVM11 may generate and store second information among debugging data in response to the second command CMD2.

In some example embodiments, in Operation S407, the storage controller 210 may transmit a third command CMD3 to the first non-volatile memory NVM11. For example, the third command CMD3 may be a command to store E-FUSE information.

In some example embodiments, in Operation S408, the first non-volatile memory NVM11 may store E-FUSE information. The first non-volatile memory NVM11 may generate and store third information among debugging data in response to the third command CMD3.

In some example embodiments, in Operation S409, the storage controller 210 may transmit a fourth command CMD4 to the first non-volatile memory NVM11. For example, the fourth command CMD4 may be a command to update an event flag.

In some example embodiments, Operation S410, the first non-volatile memory NVM11 may update an event flag. The first non-volatile memory NVM11 may update an event flag to indicate the fifth event (i.e., an erase fail event) in response to the fourth command CMD4. In some example embodiments, the storage controller 210 may transmit the first to fourth commands CMD1 to CMD4 through the control signal CTRL and the data signal DQ.

As described above, the first non-volatile memory NVM11 in which an error has occurred may generate and store debugging data of the first non-volatile memory NVM11 under the control of the storage controller 210. In FIG. 8, the second non-volatile memory NVM21 in which no error has occurred may generate and store debugging data of the second non-volatile memory NVM21 by itself in response to a dump command. Similar to FIG. 9, the second non-volatile memory NVM21 in which no error has occurred may generate and store debugging data of the second non-volatile memory NVM21 under the control of the storage controller 210.

Figure 10:
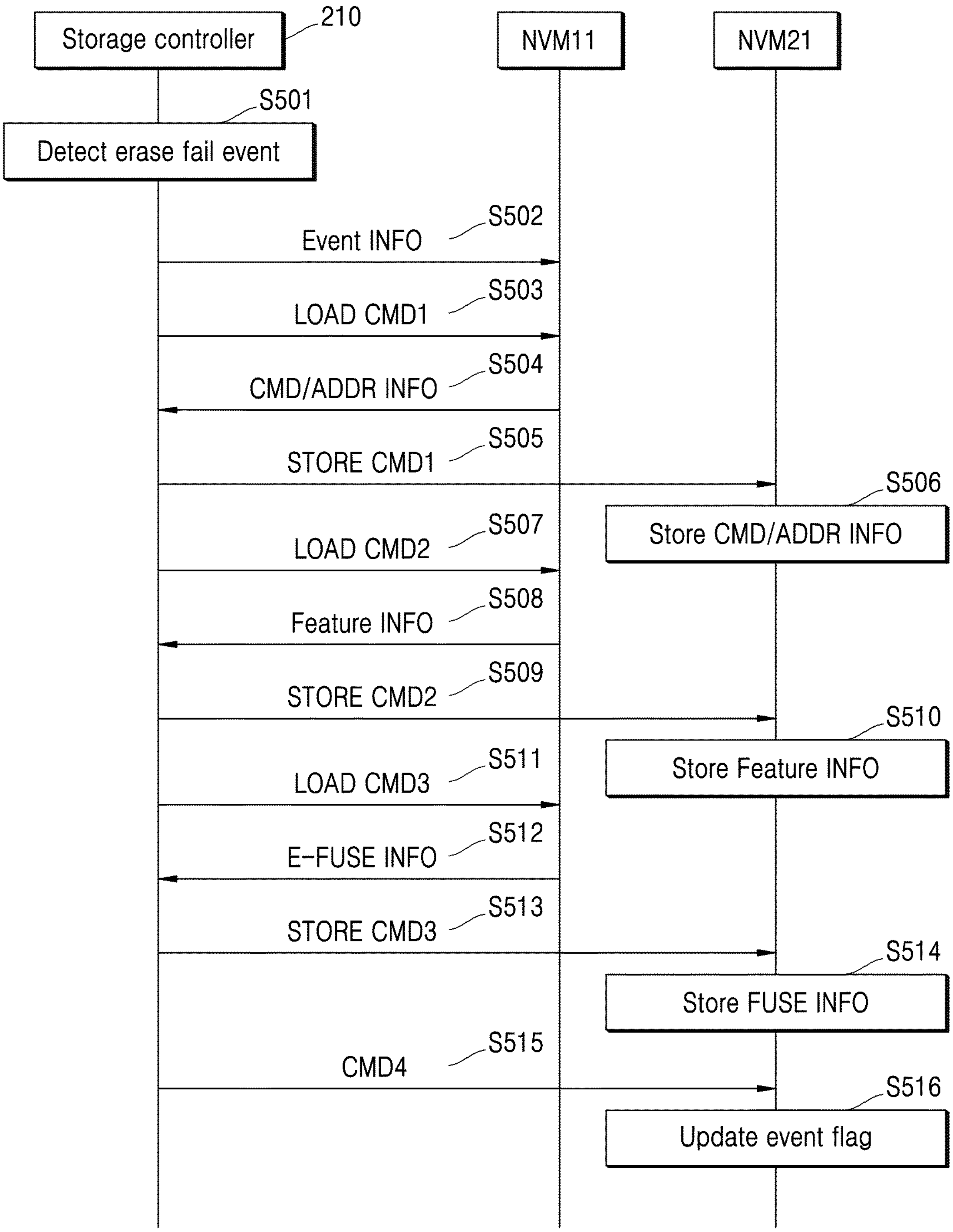
FIG. 10 is a flowchart illustrating an example of a method of operating the storage device of FIG. 1 according to some example embodiments.

FIG. 10 is a flowchart illustrating an example of a method of operating the storage device of FIG. 1 according to some example embodiments. A method of storing debugging data of the first non-volatile memory NVM11 in the second non-volatile memory NVM21 according to the control of the storage controller 210 will be described with reference to FIG. 10.

Referring to FIG. 8, the storage device 200 may store debugging data of the second non-volatile memory NVM21 in the second non-volatile memory NVM21. Referring to FIG. 10, the storage device 200 may store debugging data of the first non-volatile memory NVM11 in the second non-volatile memory NVM21.

In some example embodiments, the storage controller 210 may load debugging data of the first non-volatile memory NVM11 and store the debugging data of the first non-volatile memory NVM11 in the second non-volatile memory NVM21. For example, the storage device 200 may store debugging data of a non-volatile memory (e.g., the first non-volatile memory NVM11), in which an error has occurred, in a non-volatile memory (e.g., the second non-volatile memory NVM21), in which an error has not occurred, under the control of the storage controller 210.

In some example embodiments, in Operation S501, the storage controller 210 may detect an erase fail event. In some example embodiments, in Operation S502, the storage controller 210 may transmit event information to the first non-volatile memory NVM11. Operations S501 and S502 are the same as or similar to Operations S201 and S202 of FIG. 7, and thus, detailed descriptions thereof are omitted. The first non-volatile memory NVM11 may switch from the first mode to the second mode in response to event information.

In some example embodiments, in Operation S503, the storage controller 210 may transmit a first load command LOAD CMD1 to the first non-volatile memory NVM11. For example, the first load command LOAD CMD1 may be a command requesting first information among debugging data. For example, the first load command LOAD CMD1 may include an identifier indicating the first information.

In some example embodiments, in Operation S504, the first non-volatile memory NVM11 may transmit command/address information (e.g., CMD/ADDR INFO) to the storage controller 210. For example, the first non-volatile memory NVM11 may receive the first load command LOAD CMD1. The first non-volatile memory NVM11 may generate command/address information based on a command/address corresponding to the fifth event in response to the first load command LOAD CMD1. The first non-volatile memory NVM11 may transmit the first information among the debugging data to the storage controller 210.

In some example embodiments, in Operation S505, the storage controller 210 may transmit a first store command STORE CMD1 to the second non-volatile memory NVM21. For example, the first store command STORE CMD1 may be a command to store the first information among the debugging data. For example, the first store command STORE CMD1 may include an identifier indicating command/address information (i.e., the first information). The first store command STORE CMD1 may include the first information received from the first non-volatile memory NVM11. Alternatively, in some example embodiments, the storage controller 210 may transmit the first information to the second non-volatile memory NVM21 in addition to the first store command STORE CMD1.

In some example embodiments, in Operation S506, the second non-volatile memory NVM21 may store command/address information. The second non-volatile memory NVM21 may receive the first store command STORE CMD1 and the first information. The second non-volatile memory NVM21 may program command/address information into a dump area of the second non-volatile memory NVM21 in response to the first store command STORE CMD1.

In some example embodiments, in Operation S507, the storage controller 210 may transmit a second load command LOAD CMD2 to the first non-volatile memory NVM11. The second load command LOAD CMD2 may be a command requesting second information among the debugging data. The second load command LOAD CMD2 may include an identifier indicating feature information.

In some example embodiments, in Operation S508, the first non-volatile memory NVM11 may transmit feature information to the storage controller 210. The first non-volatile memory NVM11 may generate the second information among the debugging data in response to the second load command LOAD CMD2. The first non-volatile memory NVM11 may transmit the second information to the storage controller 210.

In some example embodiments, in Operation S509, the storage controller 210 may transmit a second store command STORE CMD2 to the second non-volatile memory NVM21. The second store command STORE CMD2 may be a command to store the second information among the debugging data. The second store command STORE CMD2 may include an identifier indicating feature information (i.e., the second information). The second store command STORE CMD2 may include the first information received from the first non-volatile memory NVM11. Alternatively, in some example embodiments, the storage controller 210 may transmit the second information to the second non-volatile memory NVM21 in addition to the second store command STORE CMD2.

In some example embodiments, in Operation S510, the second non-volatile memory NVM21 may store feature information. The second non-volatile memory NVM21 may receive the second store command STORE CMD2 and the second information. The second non-volatile memory NVM21 may program feature information into a dump area of the second non-volatile memory NVM21 in response to the second store command STORE CMD2.

In some example embodiments, in Operation S511, the storage controller 210 may transmit a third load command LOAD CMD3 to the first non-volatile memory NVM11. The third load command LOAD CMD3 may be a command requesting third information among the debugging data. The third load command LOAD CMD3 may include an identifier indicating E-FUSE information.

In some example embodiments, in Operation S512, the first non-volatile memory NVM11 may transmit the E-FUSE information to the storage controller 210. The first non-volatile memory NVM11 may generate the third information among the debugging data in response to the third load command LOAD CMD3. The first non-volatile memory NVM11 may transmit the third information to the storage controller 210.

In some example embodiments, in Operation S513, the storage controller 210 may transmit the third store command STORE CMD3 to the second non-volatile memory NVM21. The third store command STORE CMD3 may be a command to store the third information among the debugging data. The third store command STORE CMD3 may include an identifier indicating E-FUSE information (e.g., the third information). The third store command STORE CMD3 may include the third information received from the first non-volatile memory NVM11. Alternatively, in some example embodiments, the storage controller 210 may transmit the third information to the second non-volatile memory NVM21 in addition to the third store command STORE CMD3.

In some example embodiments, in Operation S514, the second non-volatile memory NVM21 may store E-FUSE information. The second non-volatile memory NVM21 may receive the third store command STORE CMD3 and the third information. The second non-volatile memory NVM21 may program E-FUSE information into a dump area in response to the third store command STORE CMD3.

In some example embodiments, in Operation S515, the storage controller 210 may transmit a fourth command CMD4 to the second non-volatile memory NVM21. The fourth command CMD4 may be a command to update an event flag. The fourth command CMD4 may include an event type indicating the fifth event and an identifier of a non-volatile memory in which an event has occurred.

In some example embodiments, in Operation S516, the second non-volatile memory NVM21 may update an event flag. The second non-volatile memory NVM21 may update the event flag based on the fourth command CMD4. The second non-volatile memory NVM21 may update the event flag to indicate the fifth event. The second non-volatile memory NVM21 may store an identifier corresponding to the first non-volatile memory NVM11 and the event flag.

In some example embodiments, the storage controller 210 may transmit the first to third load commands LOAD CMD1 to LOAD CMD3 to the first non-volatile memory NVM11 through the control signal CTRL or the data signal DQ. The storage controller 210 may transmit the first to third store commands STORE CMD1 to STORE CMD3 to the second non-volatile memory NVM21 through the control signal CTRL or the data signal DQ. The storage controller 210 may transmit the fourth command CMD4 to the second non-volatile memory NVM21 through the control signal CTRL or the data signal DQ. The first non-volatile memory NVM11 may transmit the command/address information, the feature information, the E-FUSE information, etc. to the storage controller 210 through the control signal CTRL or the data signal DQ.

As described above, in some example embodiments, the storage controller 210 may load the command/address information, the feature information, and the E-FUSE information from the first non-volatile memory NVM11 through the first to third load commands LOAD CMD1 to LOAD CMD3. The storage controller 210 may store the command/address information, the feature information, and the E-FUSE information in the second non-volatile memory NVM21 through the first to third store commands STORE CMD1 to STORE CMD3.

In some example embodiments, the storage controller 210 may load debugging data of the first non-volatile memory NVM11 through one load command (not shown). For example, the storage controller 210 may transmit a load command to the first non-volatile memory NVM11. The first non-volatile memory NVM11 may generate and transmit debugging data to the storage controller 210 in response to the load command. The debugging data may include command/address information, feature information, and E-FUSE information.

The storage controller 210 may store debugging data of the first non-volatile memory NVM11 in the second non-volatile memory NVM21 through one store command (not shown). The storage controller 210 may transmit a store command and debugging data of the first non-volatile memory NVM11 to the second non-volatile memory NVM21. The second non-volatile memory NVM21 may store command/address information among the received debugging data, feature information among the received debugging data, and E-FUSE information among the received debugging data in response to the store command.

Figure 11:
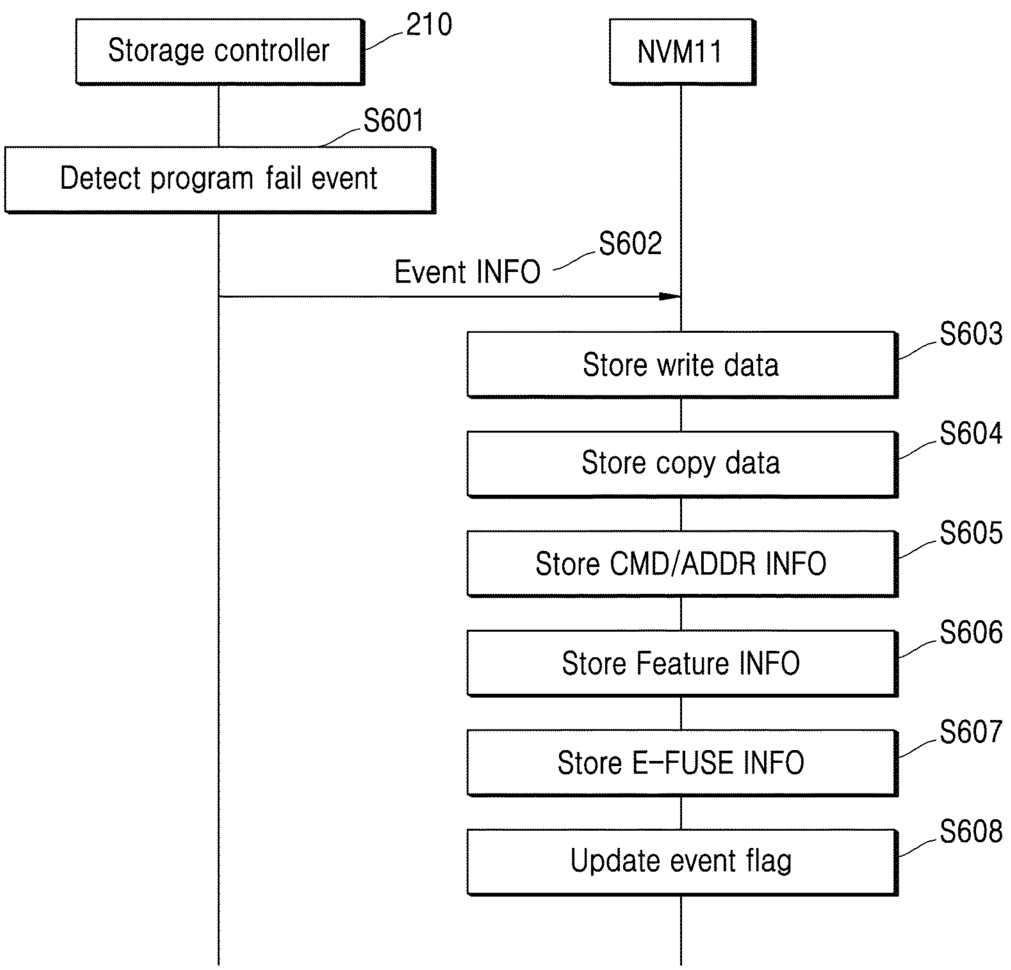
FIG. 11 is a flowchart illustrating an example of a method of operating the storage device of FIG. 1 according to some example embodiments.

FIG. 11 is a flowchart illustrating an example of a method of operating the storage device of FIG. 1 according to some example embodiments. In some example embodiments, in Operation S601, the storage controller 210 may detect a program fail event. For example, the storage controller 210 may detect the sixth event. For example, the storage controller 210 may transmit a program command to the first non-volatile memory NVM11. The storage controller 210 may transmit a status read command to the first non-volatile memory NVM11 to check a status.

The first non-volatile memory NVM11 may perform a program operation in response to the program command. An error may occur in the first non-volatile memory NVM11 during the program operation. For example, a program fail may occur in the first non-volatile memory NVM11. When a program fail occurs, the first non-volatile memory NMV1 may transmit status information indicating a fail state to the storage controller 210 in response to a status read command. The storage controller 210 may detect that a program fail event has occurred based on the status information indicating a fail state.

In some example embodiments, in Operation S602, the storage controller 210 may transmit event information to the first non-volatile memory NVM11 in response to the program fail event. The storage controller 210 may transmit event information including an event type indicating a sixth event (i.e., the program fail event) to the first non-volatile memory NVM11.

In some example embodiments, in Operation S603, the first non-volatile memory NVM11 may store write data. The first non-volatile memory NVM11 may receive event information. The first non-volatile memory NVM11 may switch from the first mode to the second mode in response to the event information. In the second mode, in some example embodiments, the first non-volatile memory NVM11 may store write data corresponding to the program fail event. The write data may be data input from the storage controller 210 to the first non-volatile memory NVM11 during a program operation. The first non-volatile memory NVM11 may program fourth information, e.g., write data, among debugging data into a dump area.

In some example embodiments, in Operation S604, the first non-volatile memory NVM11 may store copy data. The first non-volatile memory NVM11 may store copy data corresponding to a program fail event. For example, the copy data may be data stored in an address corresponding to a program fail event. Alternatively, in some example embodiments, the copy data may be data written during a program operation. The first non-volatile memory NVM11 may read data stored in an address corresponding to a program fail event. For example, the copy data may be data obtained by reading data stored in an address corresponding to a program fail event. The first non-volatile memory NVM11 may store the copy data in a dump area. The first non-volatile memory NVM11 may program fifth information among debugging data into a dump area.

In some example embodiments, in Operation S605, the first non-volatile memory NMV1 may store command/address information. The first non-volatile memory NVM11 may generate and store first information among the debugging data. For example, the first non-volatile memory NVM11 may generate the first information based on command and address information corresponding to a program fail event. The first non-volatile memory NVM11 may program the command/address information into a dump area.

In some example embodiments, in Operation S606, the first non-volatile memory NVM11 may store feature information. The first non-volatile memory NVM11 may generate and store second information among the debugging data. The first non-volatile memory NVM11 may generate the second information based on features stored in registers. The first non-volatile memory NVM11 may program the feature information into a dump area.

In some example embodiments, in Operation S607, the first non-volatile memory NVM11 may store E-FUSE information. The first non-volatile memory NVM11 may generate and store third information among the debugging data. In some example embodiments, the first non-volatile memory NVM11 may generate the third information based on data stored in an E-FUSE in the first non-volatile memory NVM11. The first non-volatile memory NVM11 may program the E-FUSE information into a dump area.

In some example embodiments, in Operation S608, the first non-volatile memory NVM11 may update an event flag. The first non-volatile memory NVM11 may update an event flag based on event information. In some example embodiments, the first non-volatile memory NVM11 may update an event flag to indicate a program fail event.

For example, even when a program fail event occurs, similarly to FIG. 8, the storage device 200 may transmit a dump command to the second non-volatile memory NVM21 in which no program fail has occurred, and may store debugging data of the second non-volatile memory NVM21. For example, even when a program fail event occurs, similarly to FIG. 9, the storage device 200 may store debugging data of the first non-volatile memory NVM11 under the control of the storage controller 210. For example, even when a program fail event occurs, similarly to FIG. 10, debugging data of the first non-volatile memory NVM11 in which a program fail has occurred may be loaded and the loaded debugging data may be stored in the second non-volatile memory NVM21 in which a program fail has not occurred.

Figure 12:
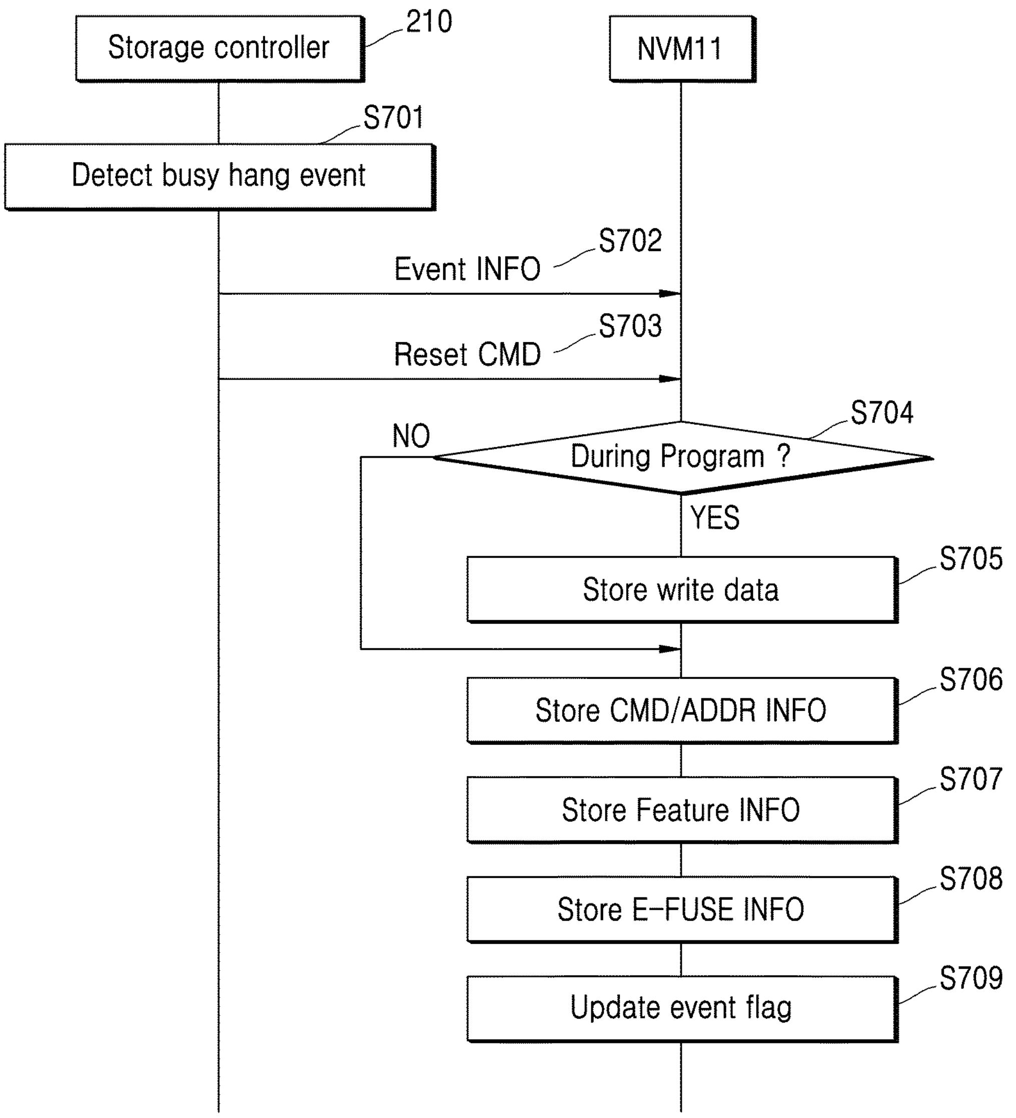
FIG. 12 is a flowchart illustrating an example of a method of operating the storage device of FIG. 1 according to some example embodiments.

FIG. 12 is a flowchart illustrating an example of a method of operating the storage device of FIG. 1 according to some example embodiments. In some example embodiments, in Operation S701, the storage controller 210 may detect a busy hang event. For example, the storage controller 210 may detect a first event. In some example embodiments, the storage controller 210 may detect a first event when receiving status information indicating a busy state for a reference time. Alternatively, in some example embodiments, the storage controller 210 may determine that the first event has occurred when the number of times status information indicating a busy state has been received is greater than or equal to a threshold value.

For example, the storage controller 210 may set (or initialize) a repetition count value to '0'. The storage controller 210 may transmit a status read command to the first non-volatile memory NVM11. The storage controller 210 may receive status information indicating a busy state from the first non-volatile memory NVM11. The storage controller 210 may increase the repetition count value by '1' in response to the status information indicating the busy state. When the status information indicates a busy state and the repetition count value is less than the threshold value, the storage controller 210 may transmit a status read command to the first non-volatile memory NVM11 again. When the status information indicates a busy state and the repetition count value is greater than or equal to the threshold value, the storage controller 210 may determine that a busy hang event has occurred. For example, the threshold value may be preset in an initialization operation.

In some example embodiments, in Operation S702, the storage controller 210 may transmit event information to the first non-volatile memory NVM11 in response to the busy hang event. The storage controller 210 may transmit event information including an event type indicating a first event (e.g., the busy hang event) to the first non-volatile memory NVM11.

In some example embodiments, in Operation S703, the storage controller 210 may transmit a reset command (e.g., 'FFh') to the first non-volatile memory NVM11. For example, after transmitting the reset command, the storage controller 210 may transmit a status read command to the first non-volatile memory NVM11. The storage controller 210 may receive status information from the first non-volatile memory NVM11. When the status information indicates a ready state, the storage device 200 may perform Operations S704 to S709. When the status information indicates a busy state, the storage device 200 may perform a super reset or power reset. The first non-volatile memory NVM11 may update an event flag to indicate a busy hang event without storing debugging data.

In some example embodiments, first non-volatile memory NVM11 may switch from the first mode to the second mode in response to event information. The first non-volatile memory NVM11 may attempt to clear the busy state in response to a reset command. Alternatively, in some example embodiments, the first non-volatile memory NVM11 may perform a reset operation in response to a reset command. In some example embodiments, because the first non-volatile memory NMV1 is expected to store debugging data in the second mode, the first non-volatile memory NMV1 may perform a reset operation without initializing data in response to a reset command.

When the busy state is cleared, the first non-volatile memory NVM11 may transmit status information indicating a ready state in response to a status read command. When the busy state is not resolved, the first non-volatile memory NVM11 may transmit status information indicating the busy state in response to a status read command.

In some example embodiments, in Operation S704, the first non-volatile memory NVM11 may determine whether a program is in operation. Alternatively, in some example embodiments the first non-volatile memory NVM11 may determine whether a busy hang event has occurred during a program operation. For example, when it is determined that a busy hang event has occurred during the program operation (or when it is determined that a program is in operation), the first non-volatile memory NVM11 performs Operation S705. For example, when it is determined that a busy hang event has not occurred during the program operation (or when it is determined that a program is not in operation), the first non-volatile memory NVM11 performs Operation S706.

In some example embodiments, in Operation S705, the first non-volatile memory NVM11 may store write data. In the second mode, the first non-volatile memory NVM11 may store write data corresponding to a busy state during a program operation. The write data may be data input from the storage controller 210 to the first non-volatile memory NVM11 during a program operation. The first non-volatile memory NVM11 may program fourth information, e.g., write data, among debugging data into a dump area.

In some example embodiments, in Operation S706, the first non-volatile memory NMV1 may store command/address information. The first non-volatile memory NVM11 may generate and store first information among debugging data. For example, the first non-volatile memory NVM11 may generate the first information based on command and address information corresponding to a busy hang event. The first non-volatile memory NVM11 may program the command/address information into a dump area.

In some example embodiments, in Operation S707, the first non-volatile memory NVM11 may store feature information. The first non-volatile memory NVM11 may generate and store second information among the debugging data. The first non-volatile memory NVM11 may generate the second information based on features stored in registers. The first non-volatile memory NVM11 may program the feature information into a dump area.

In some example embodiments, in Operation S708, the first non-volatile memory NVM11 may store E-FUSE information. The first non-volatile memory NVM11 may generate and store third information among the debugging data. In some example embodiments, the first non-volatile memory NVM11 may generate the third information based on data stored in an E-FUSE in the first non-volatile memory NVM11. The first non-volatile memory NVM11 may program E-FUSE information in a dump area.

In some example embodiments, in Operation S709, the first non-volatile memory NVM11 may update an event flag. The first non-volatile memory NVM11 may update an event flag based on event information. In some example embodiments, the first non-volatile memory NVM11 may update an event flag to indicate a busy hang event.

For example, even when a busy hang event occurs, similarly to FIG. 8, the storage device 200 may transmit a dump command to the second non-volatile memory NVM21 in which no busy hang has occurred, and may store debugging data of the second non-volatile memory NVM21. For example, even when a busy hang event occurs, similarly to FIG. 9, the storage device 200 may store debugging data of the first non-volatile memory NVM11 under the control of the storage controller 210. For example, even when a busy hang event occurs, similarly to FIG. 10, debugging data of the first non-volatile memory NVM11 in which a busy hang has occurred may be loaded and the loaded debugging data may be stored in the second non-volatile memory NVM21 in which a busy hang has not occurred.

Figure 13:
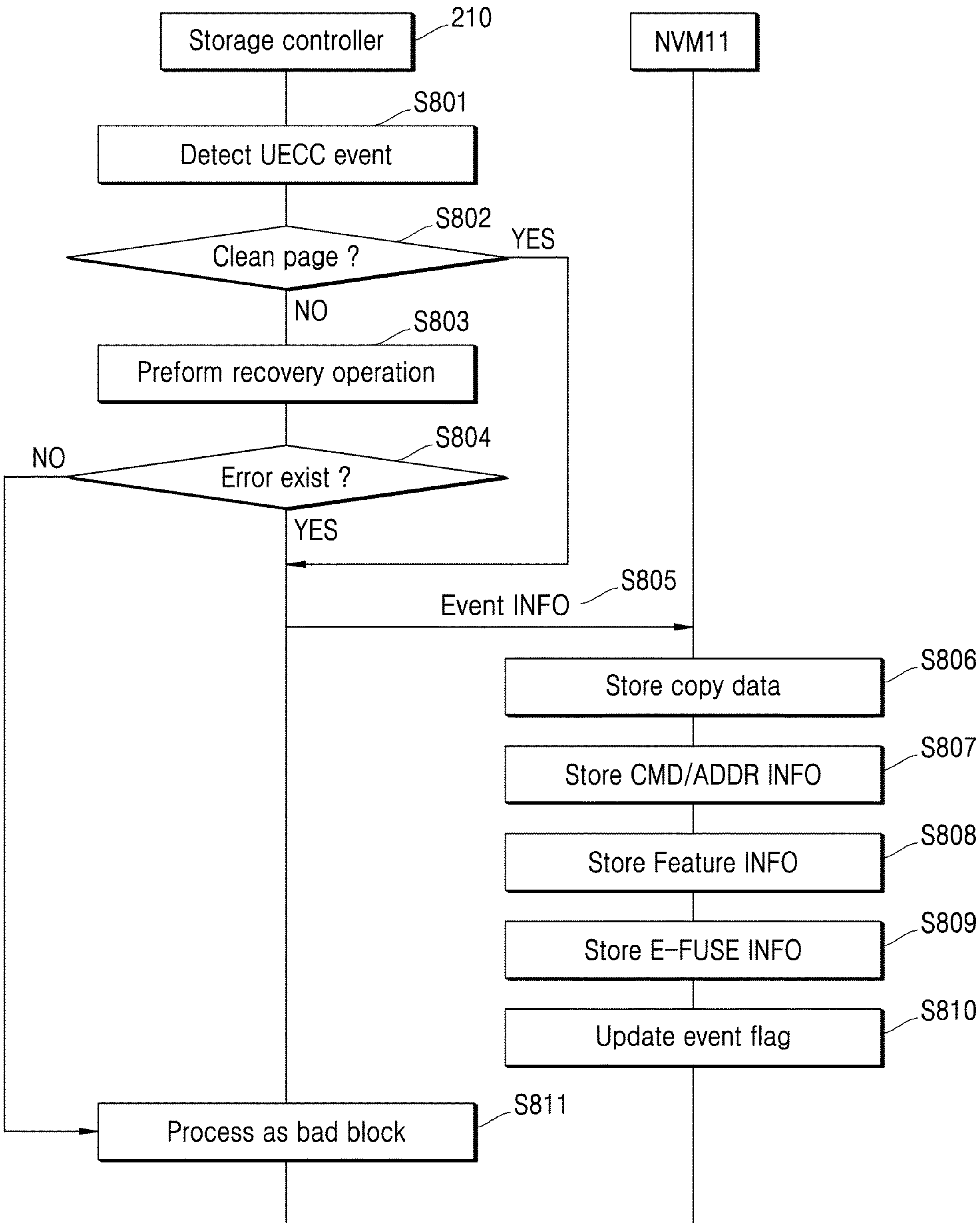
FIG. 13 is a flowchart illustrating an example of a method of operating the storage device of FIG. 1.

FIG. 13 is a flowchart illustrating an example of a method of operating the storage device of FIG. 1 according to some example embodiments. In some example embodiments, in Operation S801, the storage controller 210 may detect a UECC event. For example, the storage controller 210 may detect a second event. In some example embodiments, the storage controller 210 may detect error bits of read data received through a read operation. The ECC engine 216 may correct errors. The storage controller 210 may determine that a UECC event has occurred when the ECC engine 216 fails to correct errors in read data.

For example, the storage controller 210 may read data from the first non-volatile memory NVM11 in response to a request from the host 100. The ECC engine 216 of FIG. 2 may detect an error in the data (i.e., read data), read from the first non-volatile memory NVM11, based on parity bits read with the data, and may correct the detected error. The ECC engine 216 may have a predetermined error correction capability. For example, when the read data includes an error exceeding the error correction capability of the ECC engine 216, the ECC engine 216 may not be able to correct the error of the read data. Data including an error exceeding the error correction capability of the ECC engine 216 may be referred to as UECC data. The storage controller 210 may determine that a UECC event has occurred when an error in the read data is not corrected.

In some example embodiments, in Operation S802, the storage controller 210 may determine whether the read data is a clean page. The storage controller 210 may determine the read data as a clean page when the read data consists of all '1' bits or all '0' bits. The storage controller 210 may determine that the read data is not a clean page when the read data does not consist of all '1' bits or all '0' bits. For example, when the read data is a clean page, the storage device 200 performs Operation S805. For example, when the read data is a clean page, the storage device 200 may detect that a UECC event and a clean page event have occurred. When the read data is not a clean page, the storage device 200 performs Operation S803.

In some example embodiments, when an error occurs in read data, the storage controller 210 may determine that a clean page event of a UECC event has occurred when all bits of the read data are '1' or '0'. For example, when the error of the read data is fixed to '1' or '0', the storage controller 210 may determine that a clean page event has occurred.

In some example embodiments, in Operation S803, the storage controller 210 may perform a recovery operation. For example, the storage controller 210 may correct errors through other error correction methods or other read methods. For example, the storage controller 210 may read data from the first non-volatile memory NVM11 by using a defense code.

In some example embodiments, in Operation S804, the storage controller 210 may determine whether there is an error in the read data. The storage controller 210 may determine whether there is an error bit again after the recovery operation. For example, the storage controller 210 may determine whether there is an error in read data read through Operation S803 or read data corrected through Operation S803. When there is an error, the storage controller 210 may determine that a UECC event has occurred. When there is an error, the storage device 200 performs Operation S805. When there is no error, the storage device 200 performs Operation S811.

In some example embodiments, in Operation S805, the storage controller 210 may transmit event information to the first non-volatile memory NVM11. For example, the storage controller 210 may transmit event information including an event type indicating a UECC event or a clean page event to the first non-volatile memory NVM11.

In some example embodiments, the first non-volatile memory NVM11 may receive event information. The first non-volatile memory NVM11 may switch from the first mode to the second mode in response to event information.

In some example embodiments, in Operation S806, the first non-volatile memory NVM11 may store copy data. The first non-volatile memory NVM11 may generate and store fifth information among debugging data. The first non-volatile memory NVM11 may store copy data corresponding to a UECC event or a clean page event. For example, the copy data may be data stored in an address corresponding to a UECC event or a clean page event. Alternatively, in some example embodiments, the copy data may be data obtained by reading data stored in an address corresponding to a UECC event or a clean page event. The first non-volatile memory NVM11 may read data stored in an address corresponding to a UECC event or a clean page event. The first non-volatile memory NVM11 may program fifth information into a dump area.

In some example embodiments, in Operation S807, the first non-volatile memory NMV1 may store command/address information. The first non-volatile memory NVM11 may generate and store first information among debugging data. For example, the first non-volatile memory NVM11 may generate the first information based on command and address information corresponding to a UECC event or a clean page event. The first non-volatile memory NVM11 may program the command/address information into a dump area.

In some example embodiments, in Operation S808, the first non-volatile memory NVM11 may store feature information. The first non-volatile memory NVM11 may generate and store second information among the debugging data. The first non-volatile memory NVM11 may generate the second information based on features stored in registers. The first non-volatile memory NVM11 may program the feature information into a dump area.

In some example embodiments, in Operation S809, the first non-volatile memory NVM11 may store E-FUSE information. The first non-volatile memory NVM11 may generate and store third information among the debugging data. In some example embodiments, the first non-volatile memory NVM11 may generate the third information based on data stored in an E-FUSE in the first non-volatile memory NVM11. The first non-volatile memory NVM11 may program the E-FUSE information into a dump area.

In some example embodiments, in Operation S810, the first non-volatile memory NVM11 may update an event flag. The first non-volatile memory NVM11 may update an event flag based on event information. In some example embodiments, the first non-volatile memory NVM11 may update an event flag to indicate a UECC event or a clean page event.

In some example embodiments, after the performing of Operation S810, the first non-volatile memory NVM11 may switch from the second mode to the first mode. The first non-volatile memory NVM11 may perform a normal operation in the first mode. In some example embodiment, after the performing of Operation S810, the storage device 200 does not perform Operation S811. When there is no error in Operation S804, the storage device only performs Operation S811.

In some example embodiments, in Operation S811, the storage controller 210 may process, as a bad block, a block including read data corresponding to the UECC event. For example, the storage controller 210 may process, as a bad block, a block of the first non-volatile memory NVM11, in which read data having an error corrected through a recovery operation is stored, even though the error correction capability of the ECC engine has been exceeded. The storage controller 210 may read data (i.e., valid data) stored in a block processed as a bad block. The storage controller 210 may store valid data in a new block.

In some example embodiments, even when a UECC event or a clean page event occurs, similarly to FIG. 8, the storage device 200 may transmit a dump command to the second non-volatile memory NVM21 in which no UECC has occurred, and may store debugging data of the second non-volatile memory NVM21. In some example embodiments, even when a UECC event occurs, similarly to FIG. 9, the storage device 200 may store debugging data of the first non-volatile memory NVM11 under the control of the storage controller 210. In some example embodiments, even when a UECC event occurs, similarly to FIG. 10, debugging data of the first non-volatile memory NVM11 in which a UECC event has occurred may be loaded and the loaded debugging data may be stored in the second non-volatile memory NVM21 in which a UECC event has not occurred.

Figure 14:
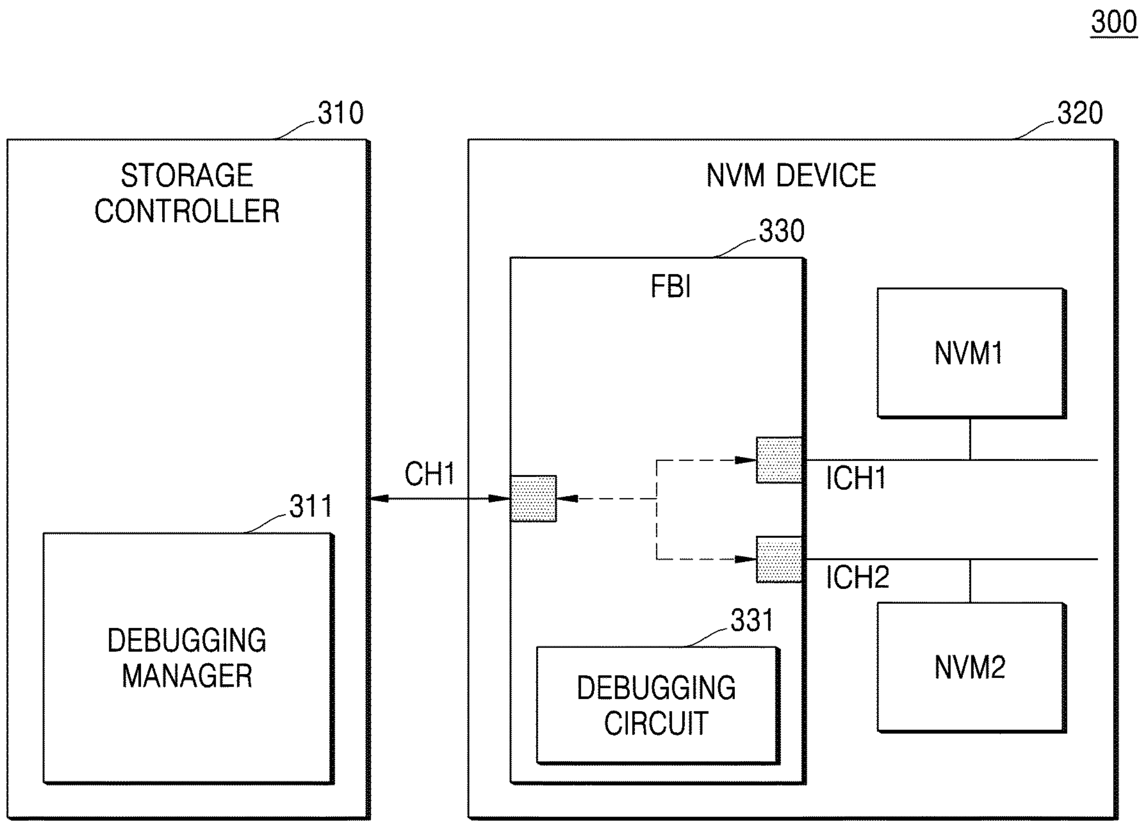
FIG. 14 is a diagram illustrating a storage device according to some example embodiments.

FIG. 14 is a diagram illustrating a storage device 300 according to some example embodiments. Referring to FIG. 14, the storage device 300 may include a storage controller 310 and a non-volatile memory device 320. The non-volatile memory device 320 may include a first non-volatile memory NVM11, a second non-volatile memory NVM21, and an interface chip (FBI) 330. The interface chip 330 may be connected to the storage controller 310 through a channel CH1 and connected to the non-volatile memories NVM1 and NVM2 through a plurality of internal channels ICH1 and ICH2. The interface chip 330 may transmit signals input through one channel CH1 to one of the plurality of non-volatile memories NVM1 and NVM2 through one of the plurality of internal channels ICH1 and ICH2. The interface chip 330 may receive signals provided from the plurality of non-volatile memories NVM1 and NVM2 through the plurality of internal channels ICH1 and ICH2, and transmit the signals to the storage controller 310 through one channel CH1.

The storage controller 310 may include a debugging manager 311. As described with reference to FIGS. 1 to 13, in some example embodiments, the debugging manager 311 may control the non-volatile memory devices 220 and 320 such that the non-volatile memory devices 220 and 320 generate and store debugging information. A detailed description of the debugging manager 311 is omitted.

The interface chip 330 may include a debugging circuit 331. In some example embodiments, the debugging circuit 331 may generate and store debugging data, as described with reference to FIGS. 1 to 13. The debugging circuit 331 may generate and store debugging information for the first non-volatile memory NVM11 in response to event information provided to the first non-volatile memory NVM11 through one channel CH1. When the debugging circuit 331 receives first and second acquisition commands GET CMD1 and GET CMD2 for the first non-volatile memory NVM11, the debugging circuit 331 may output information about an event flag for the first nonvolatile memory NVM11 and debugging information therefor.

In some example embodiments, the debugging circuit 331 may generate and store debugging information for the second non-volatile memory NVM21 in response to event information provided to the second non-volatile memory NVM21 through one channel CH1. When the debugging circuit 331 receives first and second acquisition commands GET CMD1 and GET CMD2 for the second non-volatile memory NVM21, the debugging circuit 331 may output information about an event flag for the second nonvolatile memory NVM11 and debugging information therefor.

Figure 15:
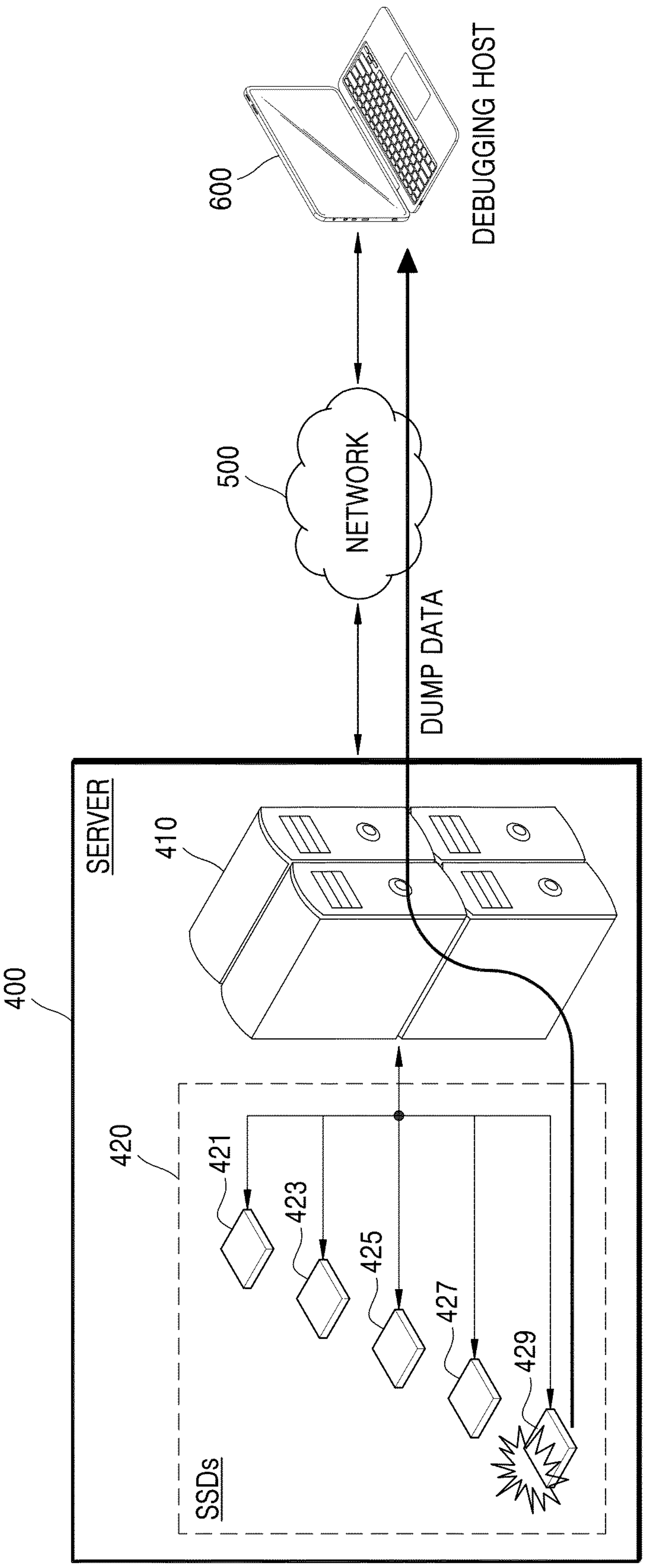
FIG. 15 is a diagram illustrating a server system according to some example embodiments.

FIG. 15 is a diagram illustrating a server system 400 according to some example embodiments. Referring to FIG. 15, the server system 400 may include a server host 410 and a storage 420.

The storage 420 may be connected to the server host 410 to exchange data. The storage 420 may include a plurality of solid state drives 421, 423, 425, 427, and 429. Each of the plurality of solid state drives 421, 423, 425, 427, and 429 may generate and store debugging data in the same manner as the storage device 200 of FIG. 1 described above.

For example, each of the plurality of solid state drives 421, 423, 425, 427, and 429 may generate and store, as debugging data, data or information received from the storage controller 210 (see FIG. 1) by the non-volatile memory device 220 (see FIG. 1) when an error occurs. Each of the solid state drives 421, 423, 425, 427, and 429 may generate and store, as debugging data, internal data, an internal state, setting/configuration information, and the like of the non-volatile memory device 220 when an error occurs. Each of the solid state drives 421, 423, 425, 427, and 429 may generate and store necessary information as debugging data according to an error type. Each of the solid state drives 421, 423, 425, 427, and 429 may generate and store information corresponding to an error type as debugging data.

Each of the solid state drives 421, 423, 425, 427, and 429 may report an error to the server host 410 and transmit debugging data thereto. For example, each of the solid state drives 421, 423, 425, 427, and 429 may receive a dump storage request to store debugging data. Each of the solid state drives 421, 423, 425, 427, and 429 may transmit dump data (or debugging data) to the server host 410.

For example, a failed solid state drive 429 will receive a dump storage request from the server host 410. The solid state drive 429 may generate dump data based on the debugging data in response to the dump storage request. The solid state drive 429 may transmit the dump data to the server host 410.

The server host 410 may transmit the dump data to a debugging host 600 through a network 500 when receiving the dump data. The dump data may be transferred to the debugging host 600 at a remote location through the network 500.

Figure 16:
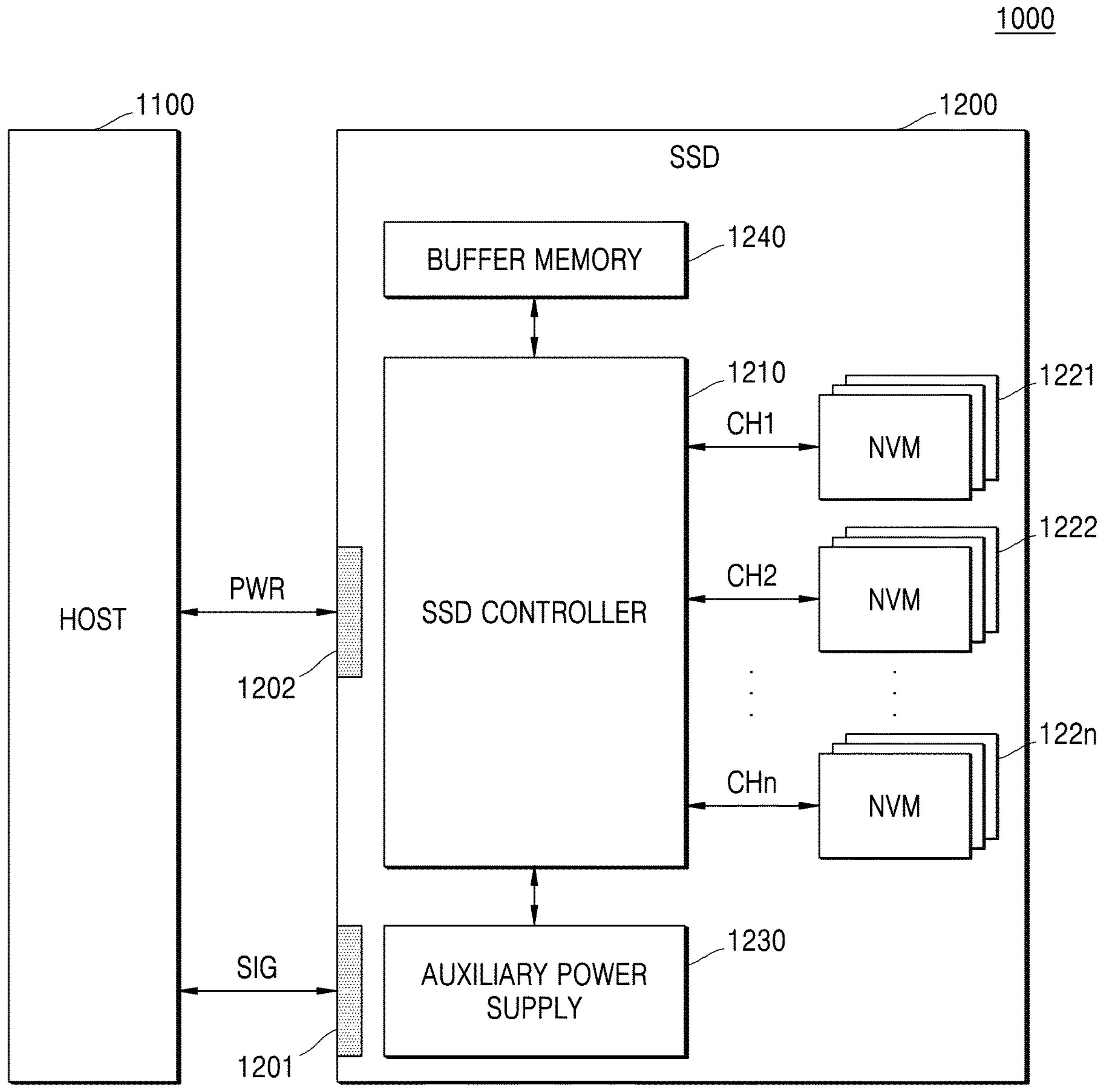
FIG. 16 is a block diagram of a solid state drive (SSD) system to which a storage device according to some example embodiments is applied.

FIG. 16 is a block diagram of a solid state drive (SSD) system 1000 to which a storage device according to some example embodiments is applied. Referring to FIG. 16, the SSD system 1000 includes a host 1100 and an SSD 1200.

The SSD 1200 exchanges a signal SIG with the host 1100 through a signal connector 1201 and receives power PWR through a power connector 1202. The SSD 1200 includes an SSD controller 1210, a plurality of flash memories 1221 to 122*n*, an auxiliary power supply 1230, and a buffer memory 1240, but example embodiments are not limited thereto.

In some example embodiments, the SSD controller 1210 may control the plurality of flash memories 1221 to 122*n* in response to a signal SIG received from the host 1100. The plurality of flash memories 1221 to 122*n* may operate under the control of the SSD controller 1210. The auxiliary power supply 1230 is connected to the host 1100 through the power connector 1202. The auxiliary power supply 1230 may receive power PWR from the host 1100 and be charged. The auxiliary power supply 1230 may provide power to the SSD 1200 when power supply from the host 1100 is not smooth. The buffer memory 1240 operates as a buffer memory of the SSD 1200.

For example, the SSD controller 1210 may include a debugging manager, as described with reference to FIGS. 1 to 15. Each of the plurality of flash memories 1221 to 122*n* may include a debugging circuit, as described with reference to FIGS. 1 to 15. In some example embodiments, the debugging circuit may be included in a non-volatile memory included in each of the plurality of flash memories 1221 to 122*n*. Alternatively, in some example embodiments, the debugging circuit may be included in an interface chip included in each of the plurality of flash memories 1221 to 122*n*.

The SSD controller 1210 may receive a request for debugging data from the host 1100 and transmit the request for debugging data to the plurality of flash memories 1221 to 122*n*. The debugging circuit may generate debugging data for the non-volatile memory and output the generated debugging data to the SSD controller 1210. The host 1100 may receive debugging data from the SSD controller 1210 and determine whether a problem occurs between the SSD controller 1210 and the plurality of flash memories 1221 to 122*n*.

Each of the plurality of flash memories 1221 to 122*n* according to some example embodiments may store internal information (i.e., debugging data) of a non-volatile memory for failure analysis when an error occurs. Based on debugging information, errors in the SSD 1200 may be detected and resolved early. Accordingly, non-volatile memory and storage devices with improved quality are provided.

While the inventive concepts have been shown and described with reference to some example embodiments thereof, it will be understood that various changes in form and details may be made therein without departing from the spirit and scope of the following claims.

What is claimed is:

1. A method of operating a storage device including a storage controller and non-volatile memories, the method comprising:

detecting, by the storage controller, an event of a first non-volatile memory among the non-volatile memories;

generating, by the storage controller, event information based on the detected event;

transmitting, by the storage controller, the event information including an event type to the first non-volatile memory;

generating, by a control logic circuit of the first non-volatile memory separate from the storage controller of the storage device, internal information or data of the first non-volatile memory as debugging data in response to the event information;

storing the debugging data by the first non-volatile memory;

updating, by the first non-volatile memory, an event flag to indicate a certain event type based on the event information;

transmitting, by the storage controller, a load command to the first non-volatile memory;

transmitting, by the first non-volatile memory, first debugging data, which is the debugging data of the first non-volatile memory, to the storage controller in response to the load command;

transmitting, by the storage controller, a store command including the first debugging data to a second non-volatile memory among the non-volatile memories;

storing the first debugging data, by the second non-volatile memory, in response to the store command; and updating an event flag by the second non-volatile memory, wherein a type of information stored in the debugging data varies based on the event type included in the event information.

2. The method of claim 1, wherein the storing of the debugging data by the first non-volatile memory includes at least one of:

storing command/address information by the first non-volatile memory;

storing feature information by the first non-volatile memory; and storing E-FUSE information by the first non-volatile memory.

3. The method of claim 1, further comprising switching, by the first non-volatile memory, from a first mode to a second mode in response to the event information.

4. The method of claim 1, wherein the detecting, by the storage controller, of the event of the first non-volatile memory among the non-volatile memories includes:

transmitting, by the storage controller, a status read command to the first non-volatile memory;

receiving, by the storage controller, status information indicating a status fail;

detecting, by the storage controller, an erase fail event based on the status information indicating the status fail in response to a command corresponding to the event being an erase command; and detecting, by the storage controller, a program fail event based on the status information indicating the status fail in response to the command corresponding to the event being a program command.

5. The method of claim 4, further comprising:

storing, by the first non-volatile memory, write data input to the first non-volatile memory, in response to the program fail event; and storing copy data by the first non-volatile memory, wherein the copy data is data obtained by reading data stored in an address corresponding to the program fail event.

6. The method of claim 1, wherein the detecting, by the storage controller, of the event of the first non-volatile memory among the non-volatile memories includes:

transmitting, by the storage controller, a status read command to the first non-volatile memory;

receiving, by the storage controller, status information indicating a busy state; and detecting, by the storage controller, a busy hang event in response to the status information maintaining the busy state for a reference time.

7. The method of claim 6, further comprising:

transmitting, by the storage controller, a reset command to the first non-volatile memory after transmitting the event information;

determining, by the first non-volatile memory, whether a program operation is in progress in response to the event information and the reset command; and storing, by the first non-volatile memory, write data received from the storage controller in response to a determination that the program operation is in progress.

8. The method of claim 1, wherein the detecting, by the storage controller, of the event of the first non-volatile memory among the non-volatile memories includes:

detecting, by the storage controller, an error bit of read data received from the first non-volatile memory;

determining, by the storage controller, whether the read data is a clean page;

detecting, by the storage controller, that a clean page event has occurred in response to the read data being the clean page;

performing, by the storage controller, a recovery operation to correct an error in response to the read data not being the clean page;

determining, by the storage controller, whether there is an error after performing the recovery operation; and detecting that an uncorrectable error correction code (UECC) event has occurred in response to a determination that there is an error after performing the recovery operation.

9. The method of claim 8, further comprising storing, by the first non-volatile memory, copy data in response to the event information indicating the UECC event or the clean page event, wherein the copy data is data obtained by reading data stored in an address corresponding to the UECC event or the clean page event.

10. The method of claim 1, further comprising:

transmitting, by the storage controller, a dump command to the second non-volatile memory;

storing, by the second non-volatile memory, debugging data of the second non-volatile memory in response to the dump command; and updating, by the second non-volatile memory, an event flag based on the dump command, wherein the second non-volatile memory is a normal non-volatile memory in which an event does not occur.

11. A method of operating a non-volatile memory, the method comprising:

receiving event information including an event type from an external storage controller through a control signal or a data signal;

switching from a first mode to a second mode in response to the event information;

generating and storing, by a control logic circuit of the non-volatile memory separate from the external storage controller, debugging data;

updating an event flag based on the event type included in the event information; and transmitting the debugging data to the external storage controller for storage in an external non-volatile memory, wherein, based on the event type included in the event information, the debugging data includes at least one of command/address information, feature information, and E-FUSE information, and wherein the debugging data is stored in the external non-volatile memory by the external storage controller through a store command including the debugging data.

12. The method of claim 11, further comprising:

receiving a first acquisition command through the control signal or the data signal;

providing the event flag to the external storage controller in response to the first acquisition command;

receiving a second acquisition command through the control signal or the data signal; and providing the debugging data including the at least one of the command/address information, the feature information, and the E-FUSE information to the external storage controller in response to the second acquisition command.

13. The method of claim 11, further comprising selecting a type of information to be stored as the debugging data, according to the event type included in the event information.

14. The method of claim 13, further comprising:

in response to the event type being a program fail event, storing write data corresponding to the program fail event and copy data obtained by reading data stored in an address corresponding to the program fail event;

in response to the event type being an uncorrectable error correction code (UECC) event, storing copy data obtained by reading data stored in an address corresponding to the UECC event; and storing received write data in response to the event type being a busy hang event and a program being in operation.

15. The method of claim 11, further comprising:

receiving a reset command in the second mode; and performing a reset operation without initializing data in response to the reset command.

16. A storage device comprising:

a plurality of non-volatile memories; and a storage controller, wherein the storage controller is configured to detect an event of a first non-volatile memory among the plurality of non-volatile memories, generate event information based on the detected event, and transmit the event information including an event type to the first non-volatile memory, wherein the first non-volatile memory among the plurality of non-volatile memories is configured to switch from a first mode to a second mode in response to the event information, generate and store, by a control logic circuit of the first non-volatile memory separate from the storage controller of the storage device, debugging data in the second mode, and update an event flag to indicate the event type included in the event information, wherein a second non-volatile memory among the plurality of non-volatile memories is configured to store the debugging data generated by the first non-volatile memory, and based on the event type included in the event information, the debugging data includes at least one of command/address information, feature information, and E-FUSE information, and wherein the storage controller is further configured to transmit a load command to the first non-volatile memory, receive the debugging data, and transmit, to the second non-volatile memory, a store command including the debugging data.

17. The storage device of claim 16, wherein the first non-volatile memory is further configured to provide the event flag and the debugging data to the storage controller.

18. The storage device of claim 16, wherein the event type is one of a busy hang event, an erase fail event, a program fail event, a UECC event, or a clean page event.

19. The storage device of claim 16, wherein the storage controller is further configured to transmit a dump command to selectively store debugging data in the second non-volatile memory, and the second non-volatile memory is a normal memory in which an event does not occur.

* * * * *